United States Patent [19]
Sturgeon et al.

[11] Patent Number: 5,726,884
[45] Date of Patent: Mar. 10, 1998

[54] INTEGRATED HAZARDOUS SUBSTANCE TRACKING AND COMPLIANCE

[75] Inventors: Douglas H. Sturgeon, San Mateo; Anthony T. Sziklai, Half Moon Bay, both of Calif.

[73] Assignee: Alternative Systems, Inc., Half Moon Bay, Calif.

[21] Appl. No.: 236,897

[22] Filed: May 2, 1994

Related U.S. Application Data

[63] Continuation-in-part of Ser. No. 844,225, Mar. 2, 1992.
[51] Int. Cl.$^6$ ................................................ G06F 169/00
[52] U.S. Cl. ...................... 395/209; 376/216; 379/40; 340/915
[58] Field of Search ........................ 364/400, 406, 364/431.06, 401 R; 376/216, 244; 52/900; 379/40–45; 340/915, 500–501, 286.04

[56] References Cited

U.S. PATENT DOCUMENTS

| | | | |
|---|---|---|---|
| 4,803,039 | 2/1989 | Impink, Jr. et al. | 376/216 |
| 5,077,788 | 12/1991 | Cook et al. | 379/142 |
| 5,185,699 | 2/1993 | Reiner et al. | 364/419 |
| 5,343,509 | 8/1994 | Doumier | 379/40 |

FOREIGN PATENT DOCUMENTS

| | | | |
|---|---|---|---|
| 2576699 | 8/1986 | France | 364/400 |
| 59-5303 | 12/1984 | Japan | 364/400 |

OTHER PUBLICATIONS

Data Sources, "Oil & Hazardous Materials Technical Assistance", Gulf Publishing Co., vol. (1.0), 1989.
Data Sources, "Haz–Mat II", Genium Publishing Corp.
Data Sources, "Human Resource Development Press", Chris Plus, 1989.
Hazwaste 2.0 (332691), Creative Management Systems, Jacksonville, FL, Dialog FIle 256, Acc #01332691.

(List continued on next page.)

*Primary Examiner*—Robert A. Weinhardt
*Assistant Examiner*—Frantzy Poinvil
*Attorney, Agent, or Firm*—John Schipper

[57] ABSTRACT

Apparatus that provides an integrated approach for all management activities for hazardous substances used or generated at a facility, including form generation and compliance with the reporting requirements. The apparatus includes eight functional groupings and a database schema or coordinator that integrates these groupings and allows them to share and exchange relevant information. The functional groupings include a hazardous materials index grouping (chemical profiles, waste profiles, Material Safety Data Sheets, etc.), a hazardous materials management grouping (MSDS generation, process definition, materials transfers, etc.), a human resource management grouping (training, exposure limits, etc.), a hazardous commitment management grouping (compliance requirements and deadlines), an emergency management grouping (planning for and response to unscheduled releases), and a facility management grouping that can be used by or for response to a regulatory agency. Optionally, a hazardous waste management grouping (waste accumulations, Hazardous Waste Manifests, etc.) or a hazardous permit management grouping (permit approvals and renewals, etc.), or both, may be combined with all or different combinations of the other functional groupings to form an operating system. Optionally, the hazardous materials index grouping plus the hazardous materials management grouping plus the emergency management grouping plus the database schema may be combined with one of the other five functional groupings to form an operating system. Optionally, the hazardous materials index grouping plus the emergency management grouping plus the database schema may be combined with one of the other six functional groupings to form an operating system. The facility management grouping may act as a stand-alone module or may be integrated and used with combinations of the other groupings.

31 Claims, 48 Drawing Sheets

OTHER PUBLICATIONS

LaPlante Alice, "State of Georgia Puts Emergency Logistics System to the Test", Sep. 21, 1992, Info World, v. 14, n 38, p. 58 (1), Dialog File 148, Acc #06196305.

"Planning for Disaster", Occupational Hazards, v 5.1, n 7, p. 40 (4) Dialog File 148, Acc. #04064037.

"Fax Store–And–Forward Bases Disaster Planning", Communications News, Jul. 1990 p. 44, Dialog File 16, Acc. #02651496.

Kearney, K.E., "Process Safety Management", Journal: Prof. Saf. Vol. 38, Issue 8, pp. 16–22, Dialog File 317, Acc. #033205.

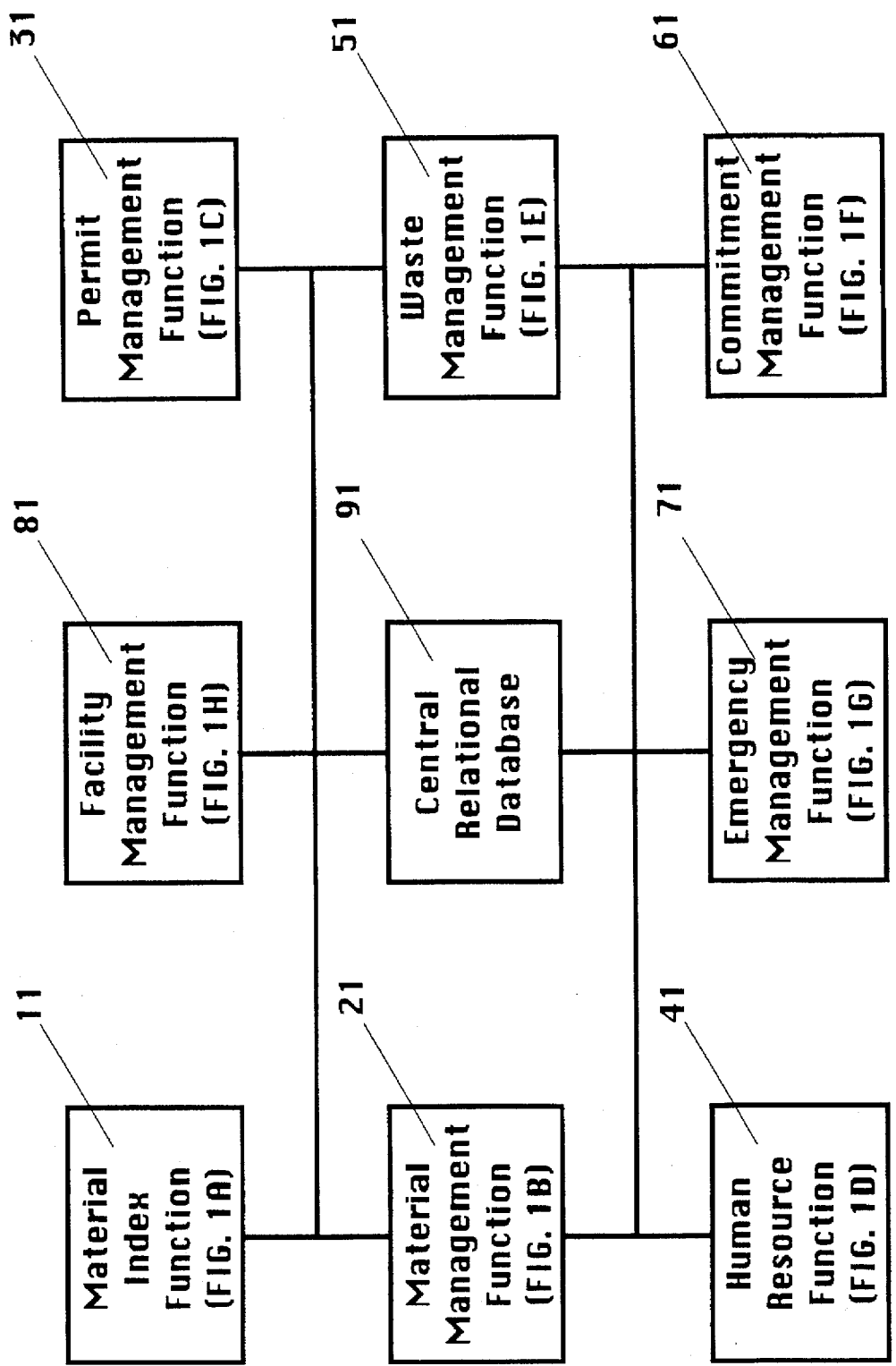
FIG._1

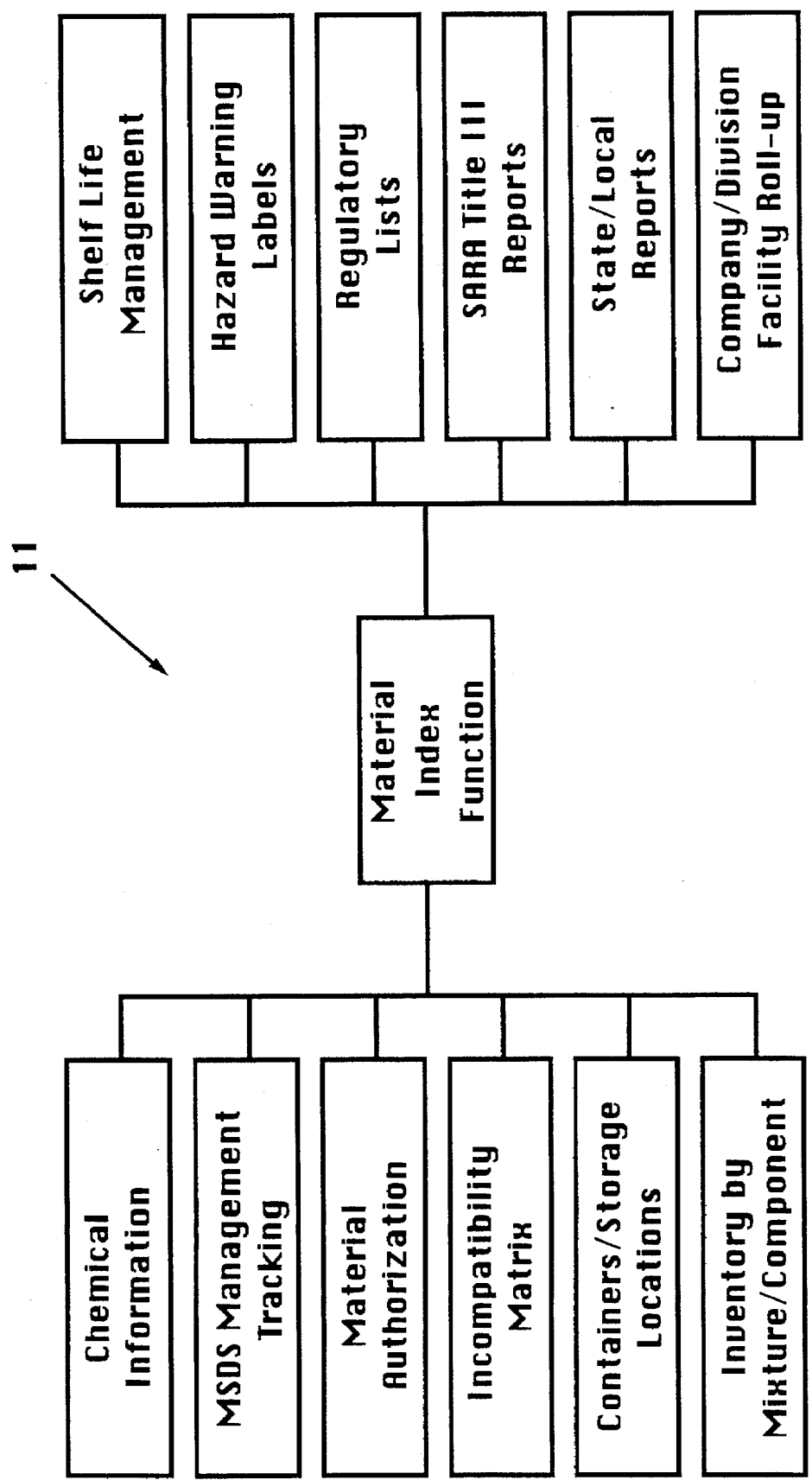
FIG._1A

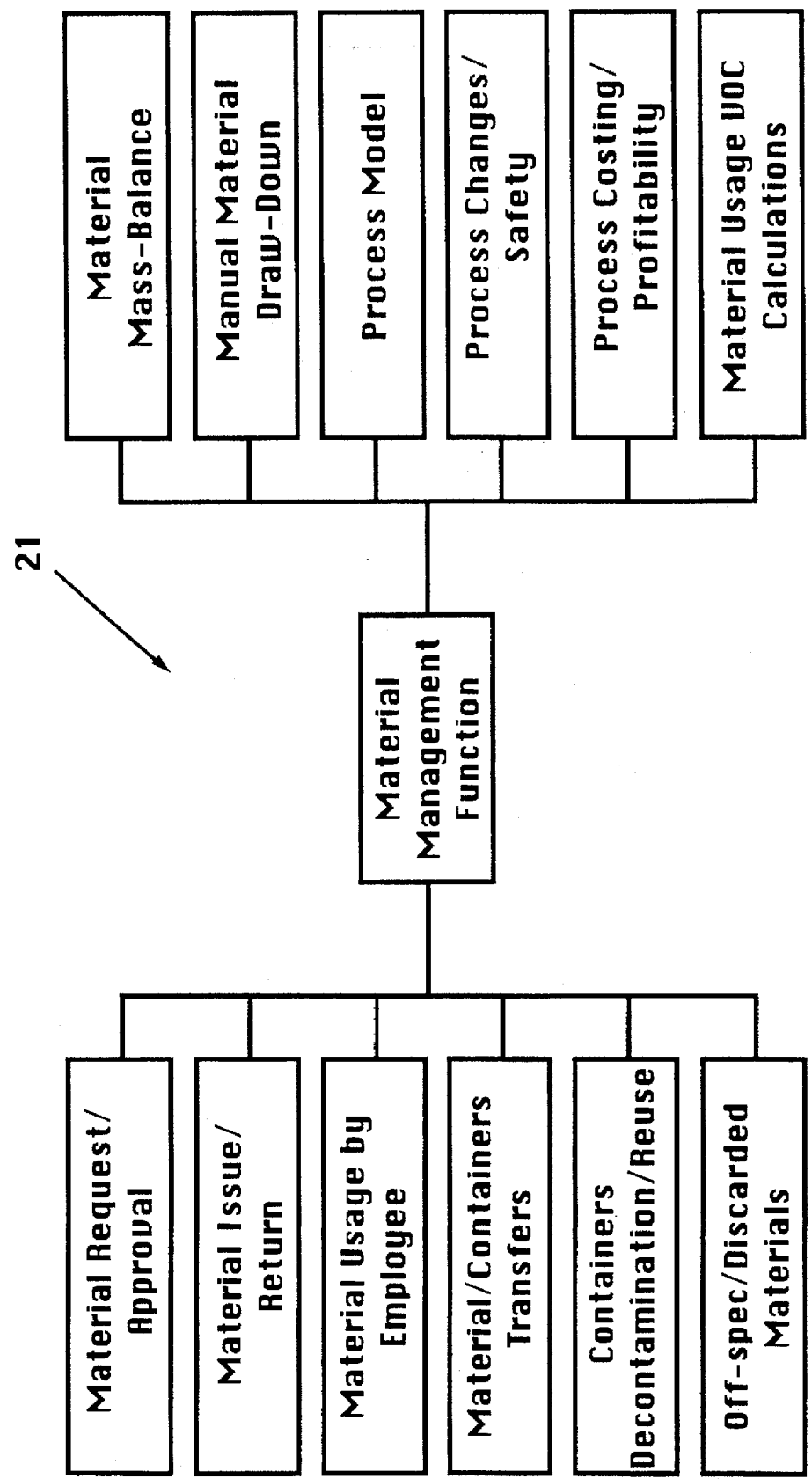
FIG._1B

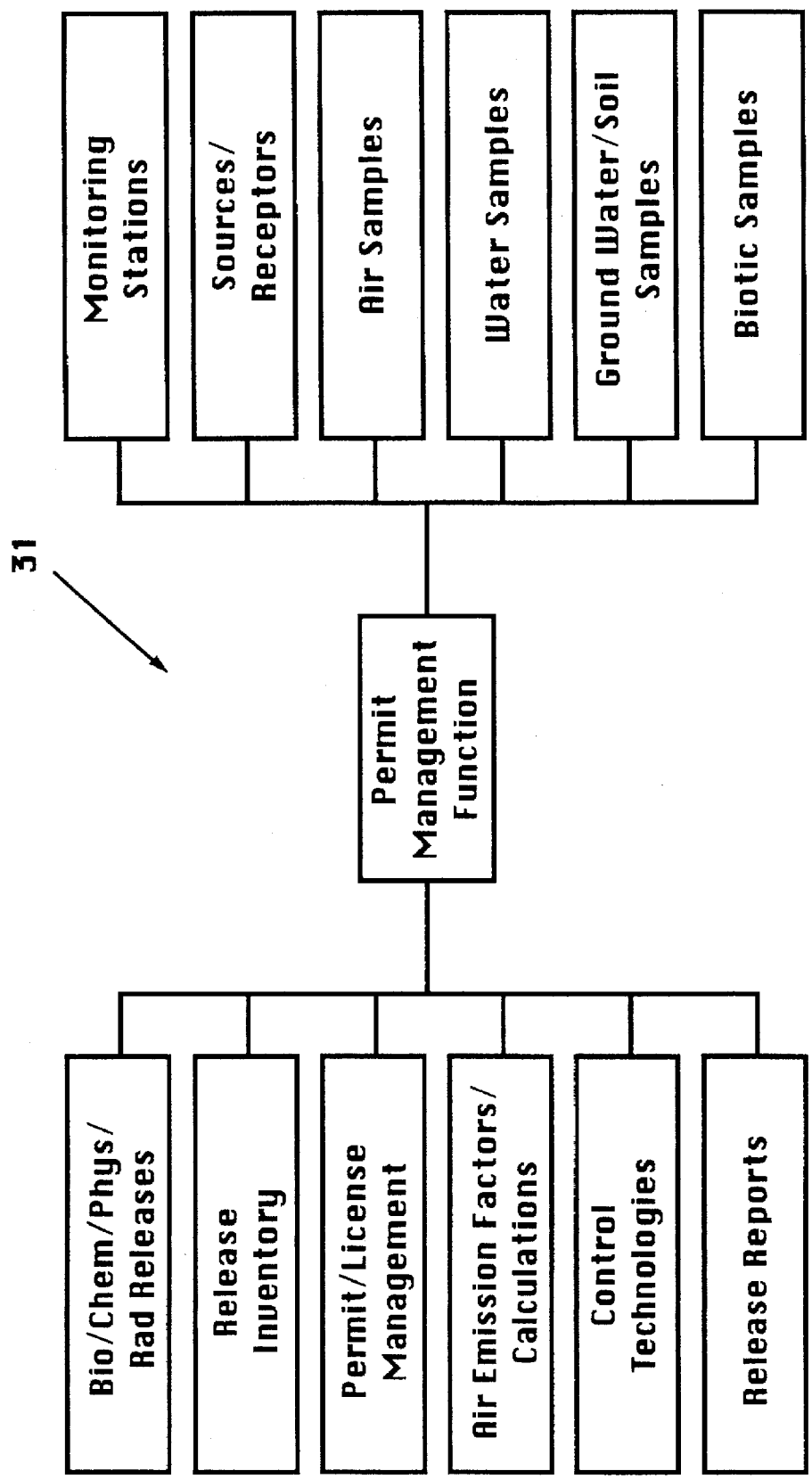
FIG._1C

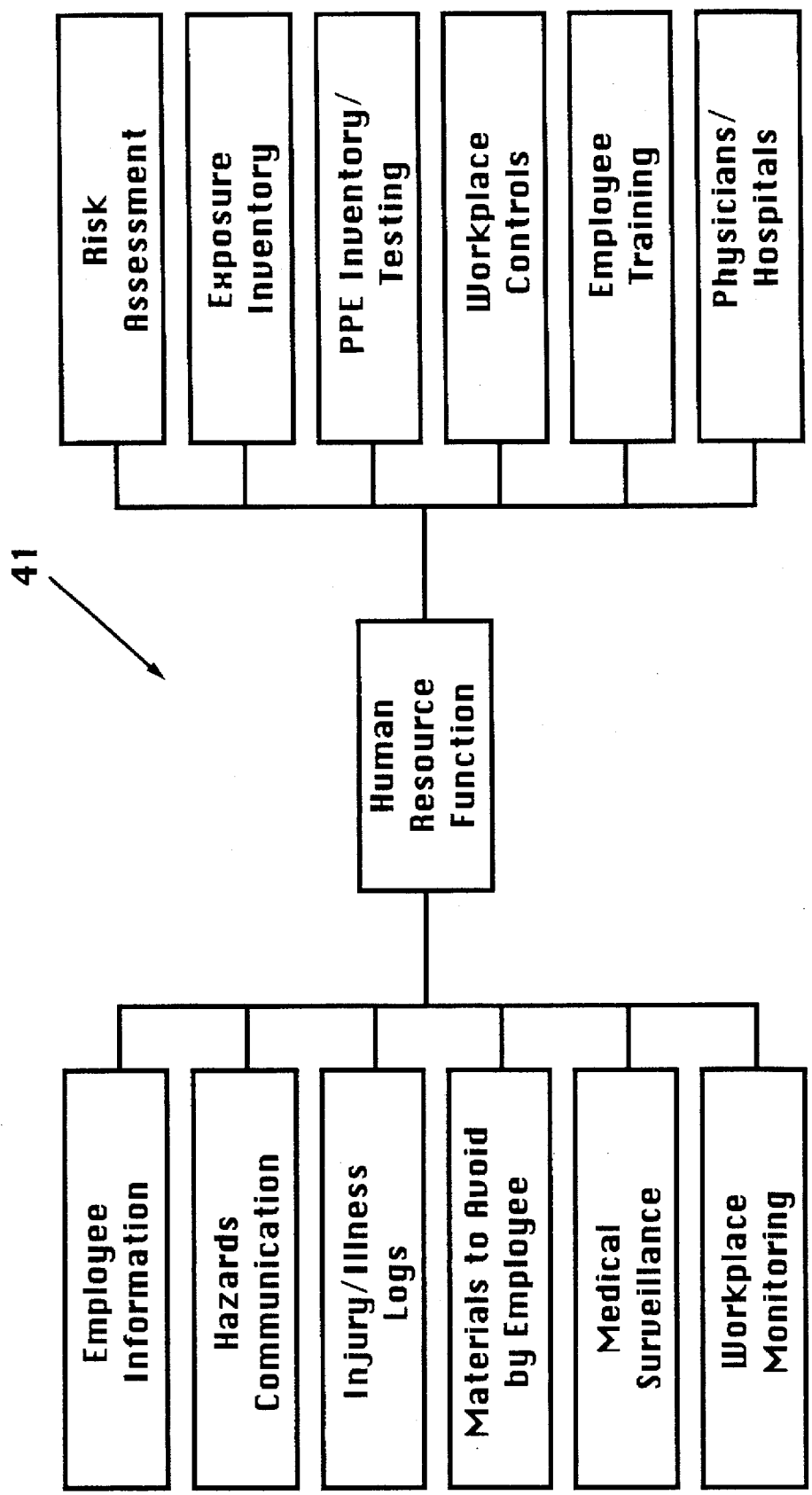
FIG._1D

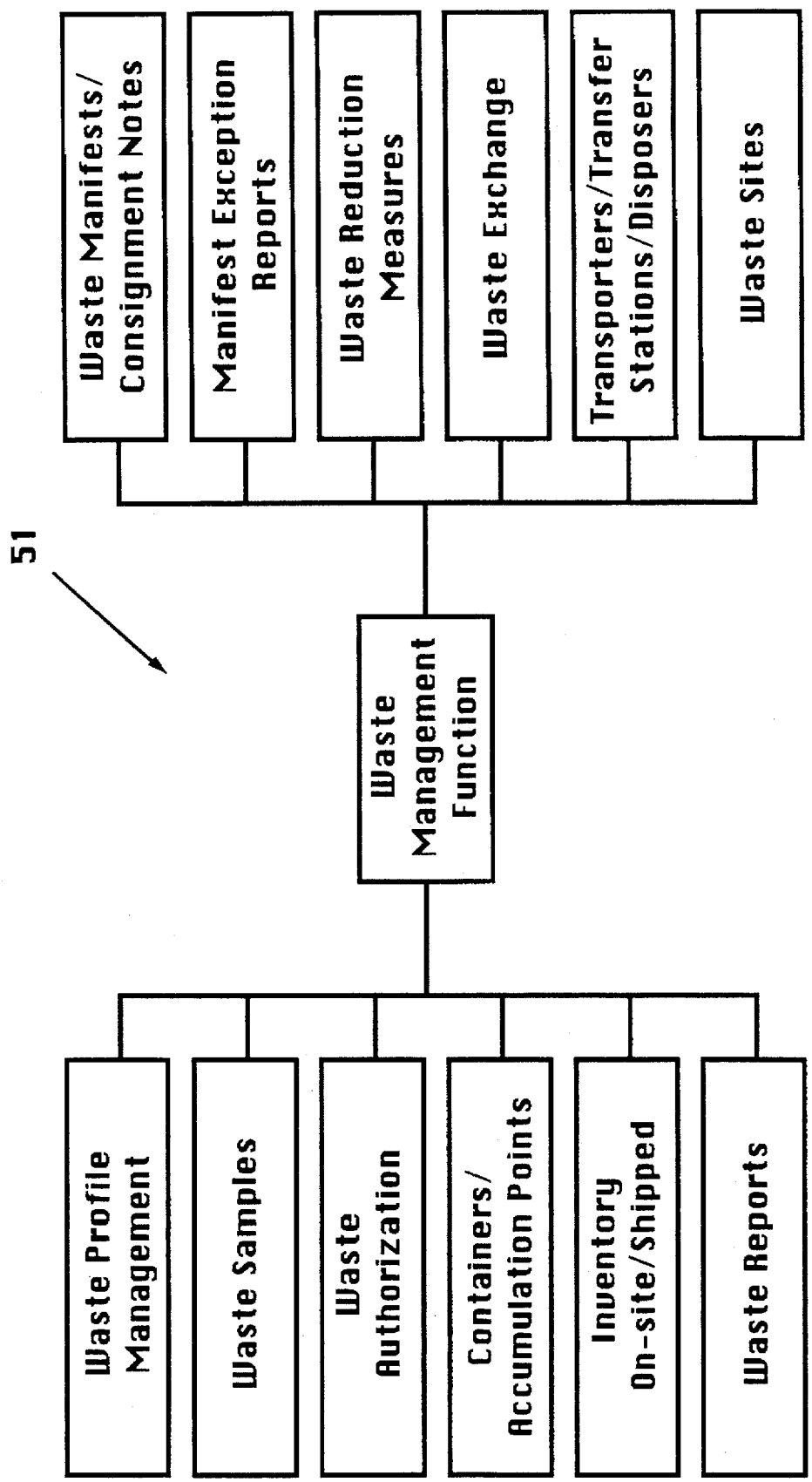
FIG._1E

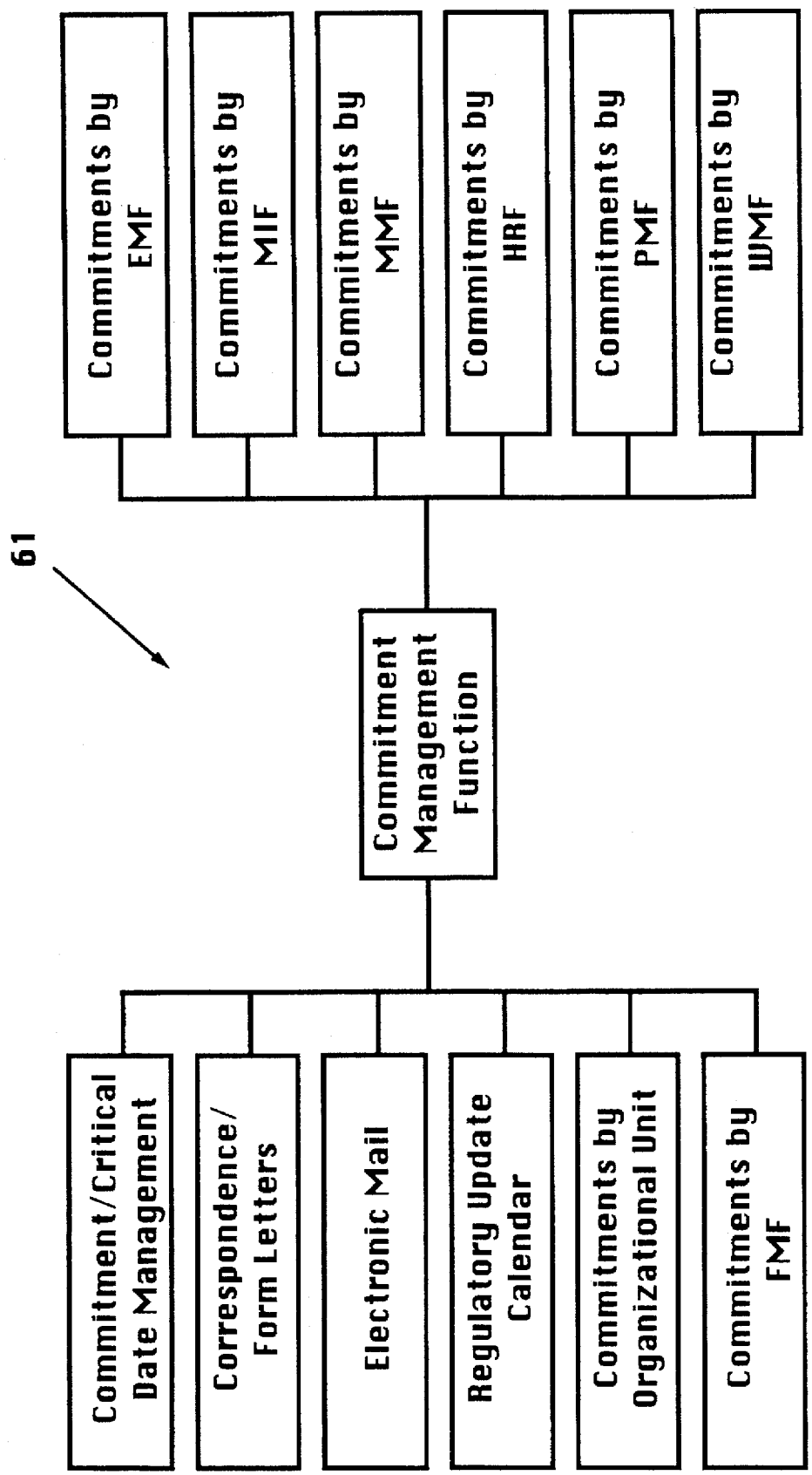
FIG._1F

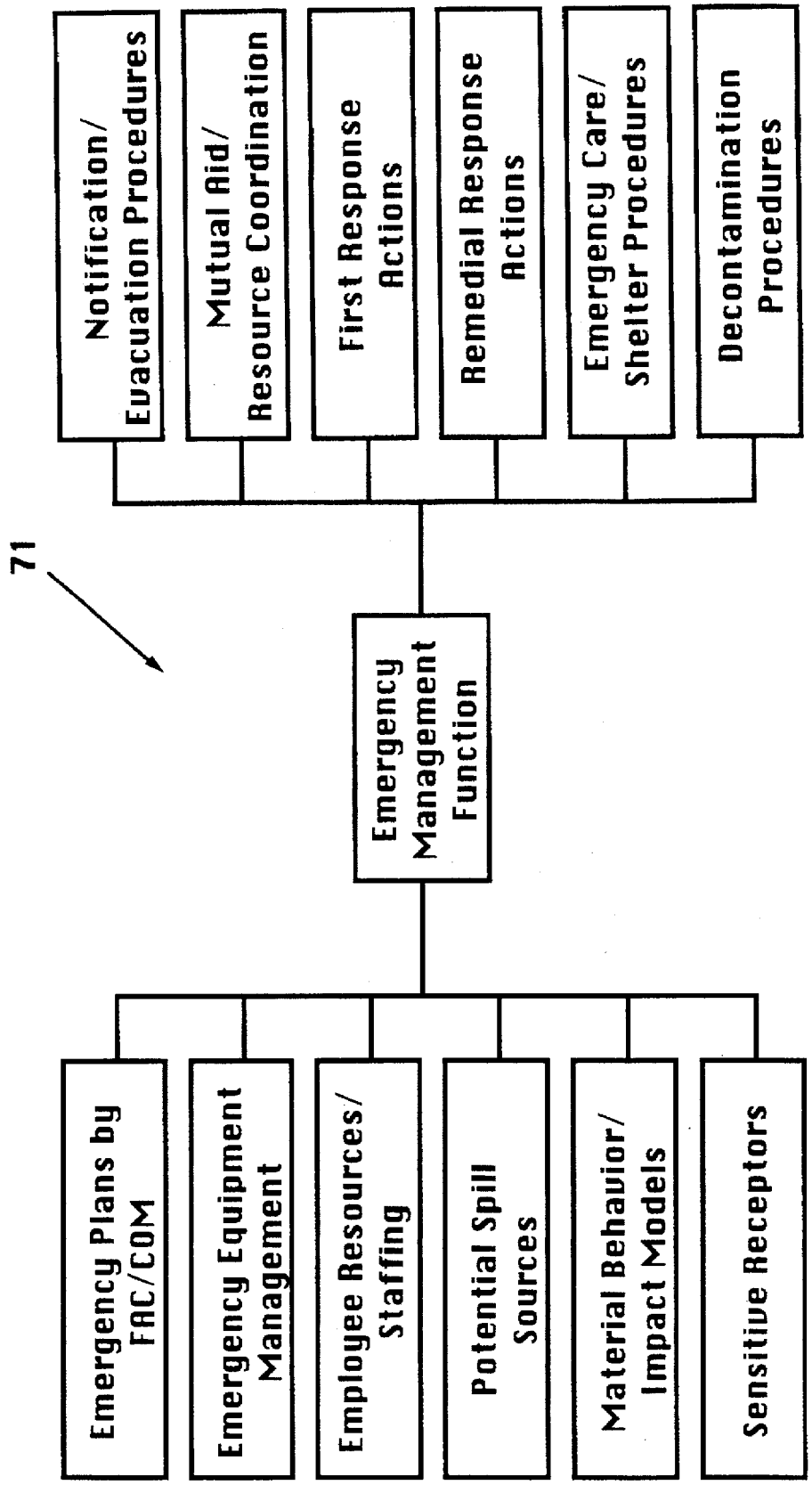
FIG._1G

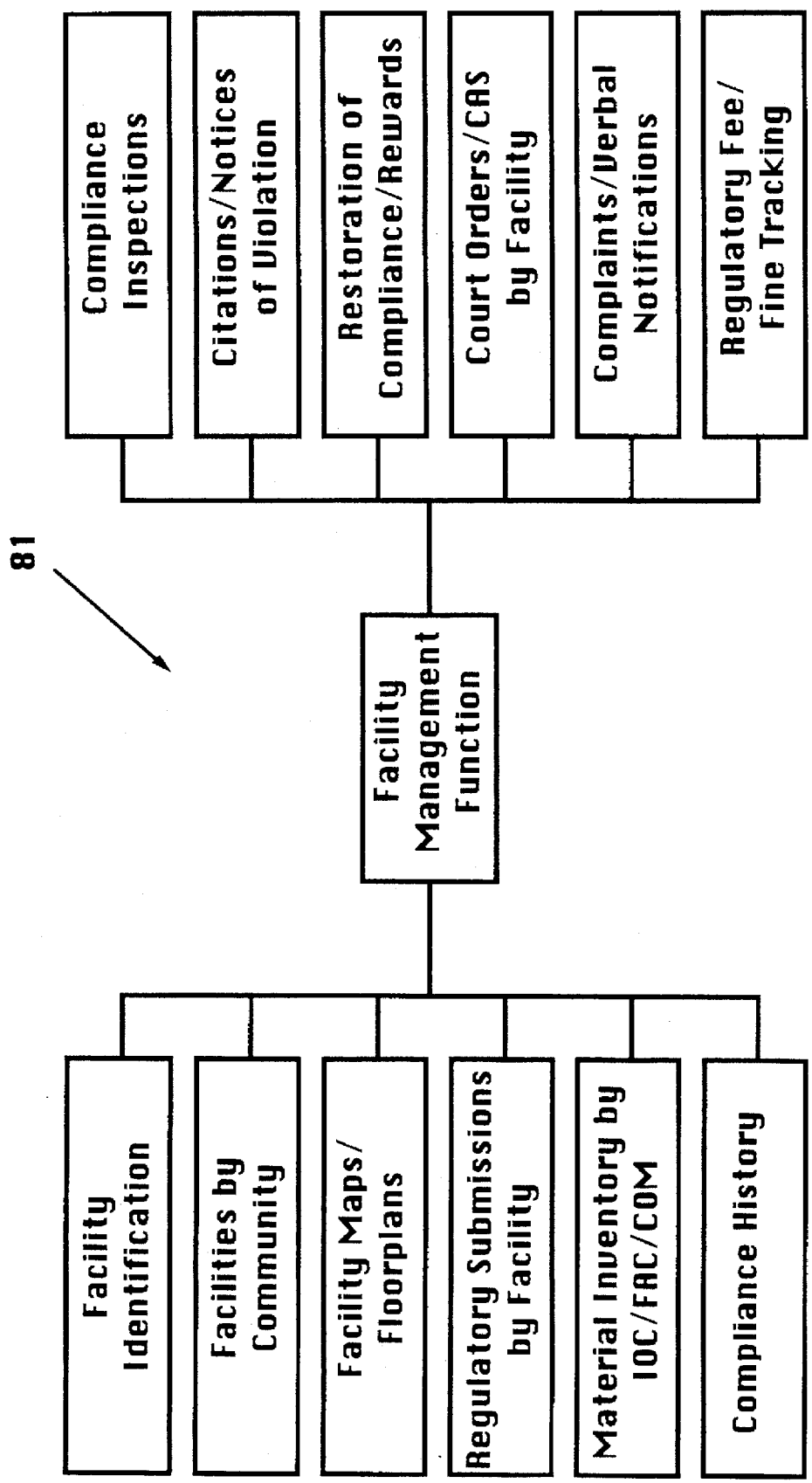
FIG._1H

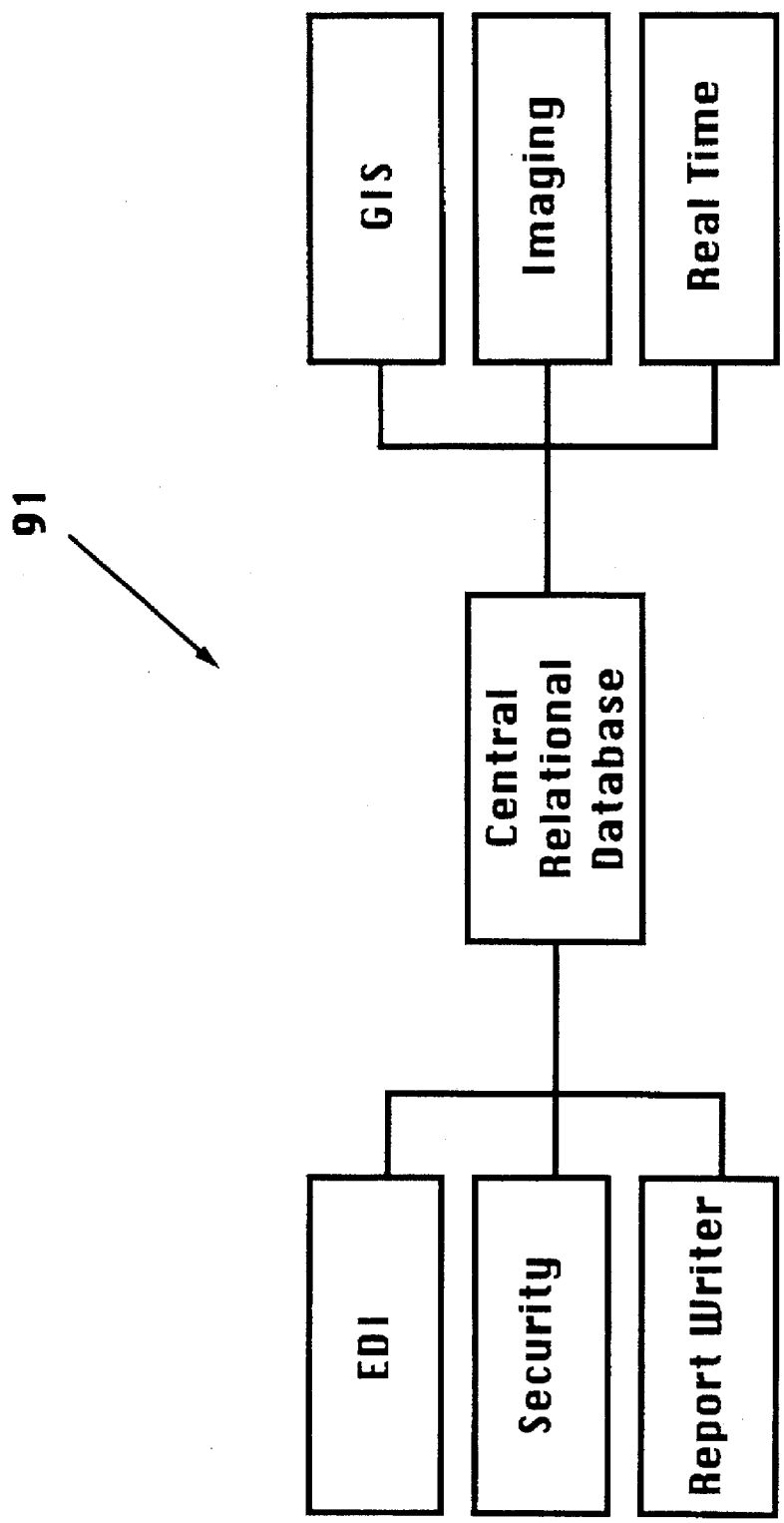
FIG._1J

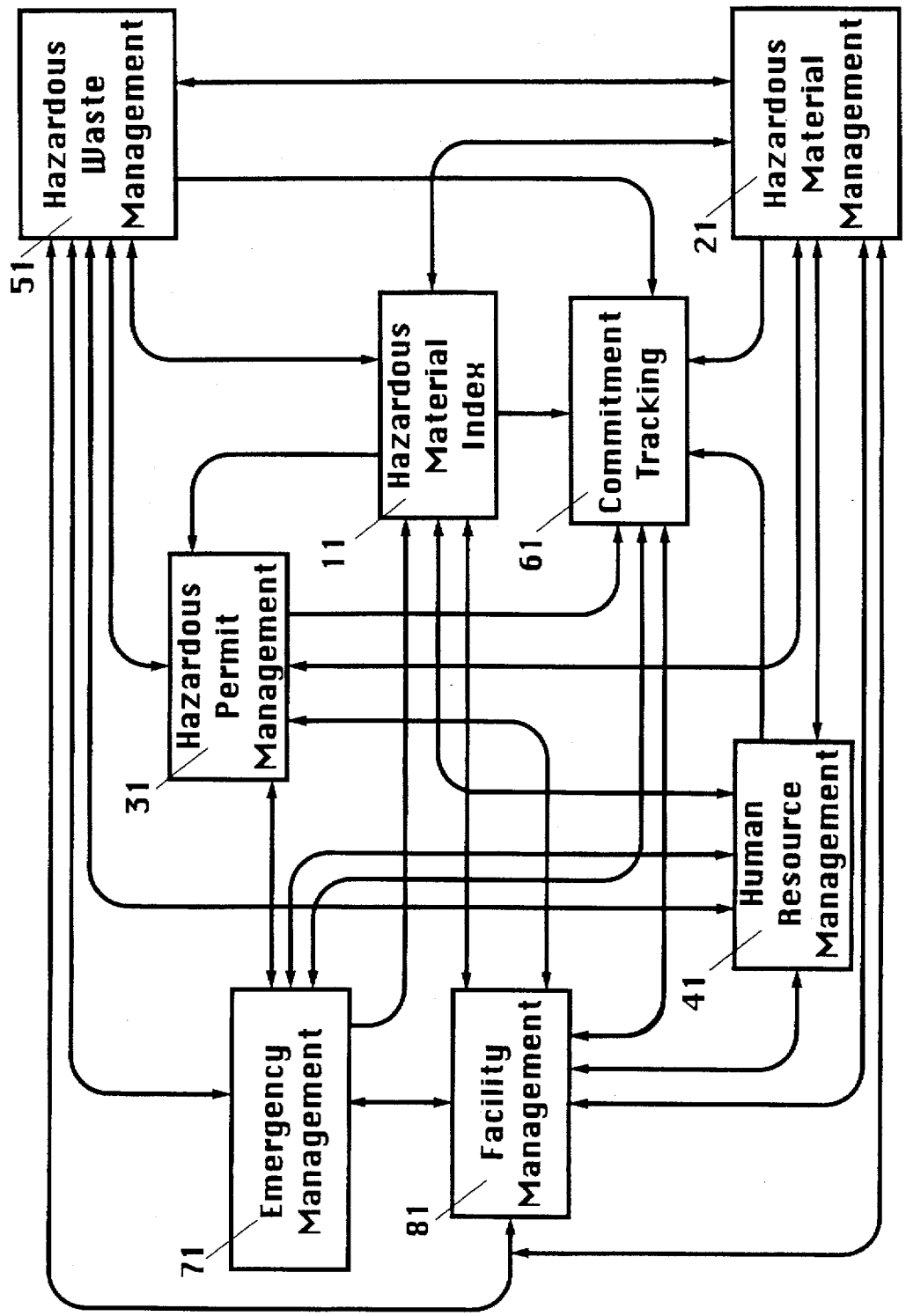
FIG._2

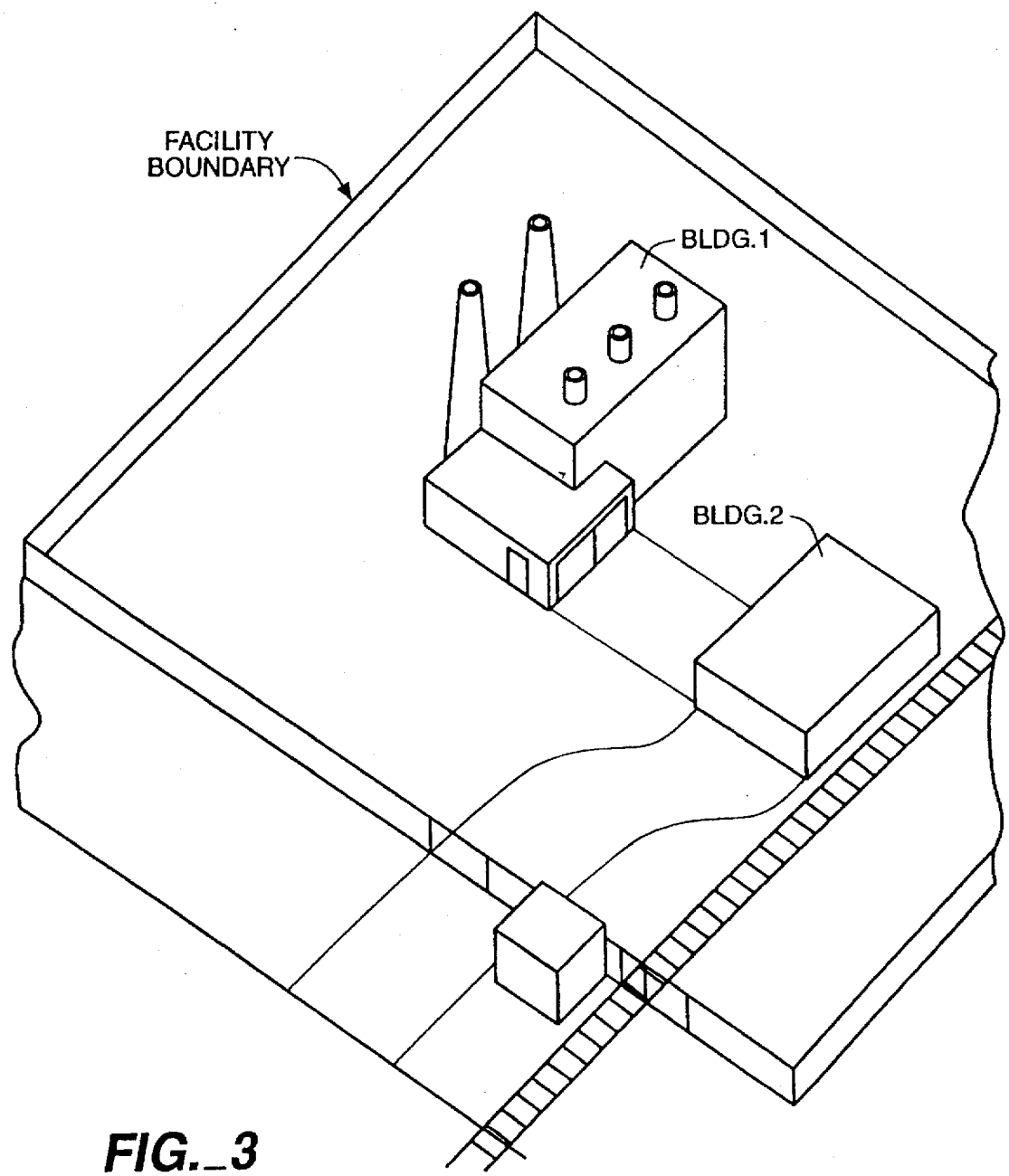
FIG._3

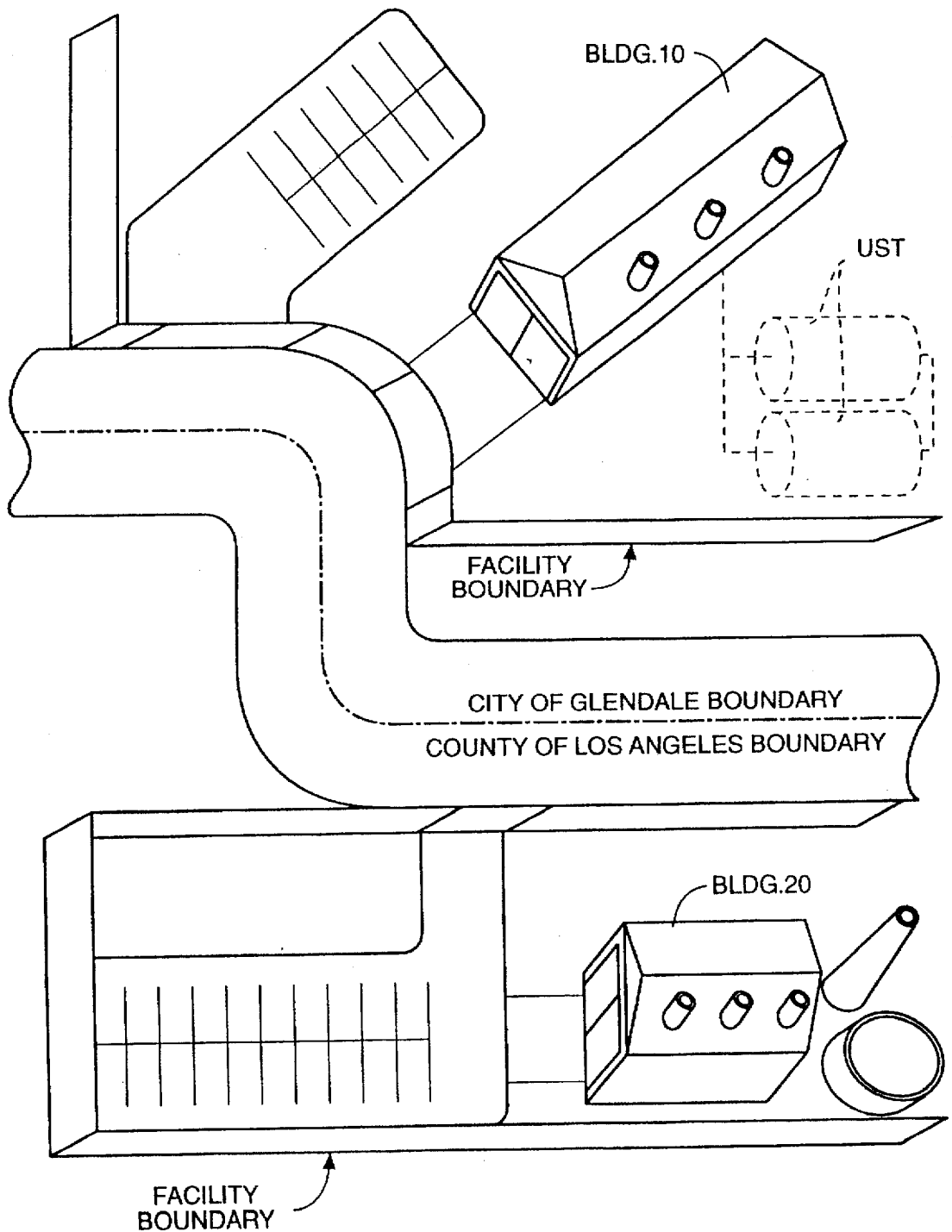
FIG._4

```
┌─ > Block ──────────── Chemical Profile ──────────────┐
│     Chemical ID:[      ]  C.A.S. No:[      ]   Synonym Lookup:☐ │
│           Name:[                                    ]│
│          UN ID:[     ]  RCRA Waste:[       ]        │
│        Formula:[                                   ] │
│  Chemical Group:[                                  ] │
│   Generic Name:[                                   ] │
│        Remark:[                                    ] │
│                                                      │
└──────────────────────────────────────────────────────┘
```

FIG._5

```
┌─ < > Block ──────────── Chemical Profile ────────────┐
│     Chemical ID:[      ]  C.A.S. No:[      ]  Synonym Lookup:☐│
│           Name:[                                    ]│
├─────────────────── Synonyms ─────────────────────────┤
│                                                      │
│           ┌──────────────────────────────┐           │
│           │                              │           │
│           │                              │           │
│           │                              │           │
│           └──────────────────────────────┘           │
│                                                      │
└──────────────────────────────────────────────────────┘
```

FIG._6

< > Block ─── Chemical Profile ───

Chemical ID: [    ]  C.A.S. No: [    ]  Synonym Lookup: ☐
Name: [    ]

─── Physical Properties ─── Page 1 of 2

Boiling Point: [    ]  Degrees: ☐  Evaporation Rate: [    ]
Melting Point: [    ]  Degrees: ☐  Specific Gravity: [    ]
Vapor Density: [    ]           Vapor Pressure: [    ]
Water Solubility: [    ]         State S / L / G : ☐ [    ]
% Volatile By Wt: [    ]
Appearance: [    ]
Odor: [    ]

FIG._7

< > Block ─── Chemical Profile ───

Chemical ID: [    ]  C.A.S. No: [    ]  Synonym Lookup: ☐
Name: [    ]

─── Physical Properties ─── Page 2 of 2

Flash Point: [    ]  Degrees: ☐
Flammable Lower Limit: [    ]  Flammable Upper Limit: [    ]
Flammability Comments: [    ]
Extinguishing Media: [    ]
Fire Fighting Procedures: [    ]
Fire & Explosion Hazard: [    ]

FIG._8

```
┌─ < > Block ─────────── Chemical Profile ──────────────────┐
│   Chemical ID:[_____] C.A.S. No:[_____]  Synonym Lookup:☐ │
│       Name:[_____] │
│  ┌──────────────────── Reactivity ────────────────────────┐│
│  │              Stability: ☐                               ││
│  │     Conditions To Avoid: [_____]││
│  │  Hazardous Polymerization: ☐                            ││
│  │     Conditions To Avoid: [_____]││
│  │         Incompatibility: [_____]││
│  │   Decomposition Products: [_____]││
│  │               Remarks: [_____]││
│  └────────────────────────────────────────────────────────┘│
└────────────────────────────────────────────────────────────┘
```

FIG._9

```
┌─ < > Block ─────────── Chemical Profile ──────────────────┐
│   Chemical ID:[_____] C.A.S. No:[_____]  Synonym Lookup:☐ │
│       Name:[_____] │
│  ┌──────────────────── Reactivity Group ──────────────────┐│
│  │  RGN          Description                               ││
│  │ ┌───┐ ┌────────────────────────────────────────────┐   ││
│  │ │   │ │                                            │   ││
│  │ │   │ │                                            │   ││
│  │ │   │ │                                            │   ││
│  │ └───┘ └────────────────────────────────────────────┘   ││
│  └────────────────────────────────────────────────────────┘│
└────────────────────────────────────────────────────────────┘
```

FIG._10

```
┌─ < > Block ──────────── Chemical Profile ───────────────┐
│     Chemical ID:[      ]  C.A.S. No:[       ]  Synonym Lookup:☐ │
│     Name:[                                              ] │
│  ┌──────────────── Hazard Category ─────────────────┐ │
│  │ ──────────────── EPA ────────────────────────── │ │
│  │  Fire: ☐   Pressure: ☐   Reactive: ☐   Acute: ☐   Chronic: ☐ │ │
│  │ ──────────────── OSHA ───────────────────────── │ │
│  │ Flammable:    Explosive:    Unstable:    Highly Toxic:    Carcin: ☐ │ │
│  │ Comb Liq:     Comb Liq:     Org. Perox:   Toxic: │ │
│  │ Pyrophoric:                 Water React:  Irritant: │ │
│  │ Oxidizer:                                 Sensitizer: │ │
│  │                                           Corrosive: │ │
│  │ ── Target Organ Effect ──     ── NFPA ── │ │
│  │ Hepatotoxin:  Repro Sys:     Health: │ │
│  │ Nephrotoxin:  Mutagen:       Flam: │ │
│  │ Neurotoxin:   Teratogen:     React: │ │
│  │ Hematotoxin:  Cutaneous:     Spec: │ │
│  │ Pulmonotoxin: Eye: │ │
│  └──────────────────────────────────────────────────┘ │
└─────────────────────────────────────────────────────────┘
```

FIG._11

```
┌─ < > Block ──────────── Chemical Profile ───────────────┐
│     Chemical ID:[      ]  C.A.S. No:[       ]  Synonym Lookup:☐ │
│     Name:[                                              ] │
│  ┌──────────────── Exposure Limits ─────────────────┐ │
│  │                    PPM            mg / m3         │ │
│  │   ACGIH TLV-TWA:                                  │ │
│  │   Other TLV-TWA:                                  │ │
│  │   ACGIH TLV-STEL:                                 │ │
│  │   Other TLV-STEL:                                 │ │
│  │   ACGIH Ceiling:                                  │ │
│  │   Other Ceiling:                                  │ │
│  │   OSHA PEL-TWA:                                   │ │
│  │   Other PEL-TWA:                                  │ │
│  │   OSHA PEL-STEL:                                  │ │
│  │   Other PEL-STEL:                                 │ │
│  │   OSHA Ceiling:                                   │ │
│  │   ACGIH Skin: ☐    OSHA Skin: ☐    Other Skin: ☐  │ │
│  └──────────────────────────────────────────────────┘ │
└─────────────────────────────────────────────────────────┘
```

FIG._12

```
┌─ < > Block ──────────── Chemical Profile ──────────────┐
│    Chemical ID: [      ]  C.A.S. No: [      ]  Synonym Lookup: ☐
│    Name: [                                                    ]
│  ┌──────────────── Health Hazards ──────────── Page 1 of 2 ─┐
│  │  Routes of Entry         Remarks
│  │       Inhalation: ☐ [                                    ]
│  │     Skin Contact: ☐ [                                    ]
│  │        Ingestion: ☐ [                                    ]
│  │      Eye Contact: ☐ [                                    ]
│  │     Acute Effects: [                                     ]
│  │   Chronic Effects: [                                     ]
│  └──────────────────────────────────────────────────────────┘
└──────────────────────────────────────────────────────────────┘
```

*FIG._13*

```
┌─ < > Block ──────────── Chemical Profile ──────────────┐
│    Chemical ID: [      ]  C.A.S. No: [      ]  Synonym Lookup: ☐
│    Name: [                                                    ]
│  ┌──────────── Health Hazard Symptoms ──────── Page 2 of 2 ─┐
│  │   Cancer Agent            Remarks
│  │           IARC: ☐ [                                      ]
│  │            NTP: ☐ [                                      ]
│  │           OSHA: ☐ [                                      ]
│  │   Exposure Signs: [                                      ]
│  │   Med Cond Aggrv: [                                      ]
│  └──────────────────────────────────────────────────────────┘
└──────────────────────────────────────────────────────────────┘
```

*FIG._14*

```
┌─ < > Block ──────────── Chemical Profile ─────────────────┐
│   Chemical ID: [_____]  C.A.S. No: [_____]   Synonym Lookup: ☐ │
│   Name: [_____]│
│ ┌──────────────────── Safety Measures ──────────────────┐ │
│ │  Respiratory Protection: [_____]│ │
│ │             Ventilation: [_____]│ │
│ │        Protective Gloves: [_____]│ │
│ │           Eye Protection: [_____]│ │
│ │     Other Protective Equip: [_____]│ │
│ │   Work / Hygienic Practices: [_____]│ │
│ └────────────────────────────────────────────────────────┘ │
└────────────────────────────────────────────────────────────┘
```

FIG._15

```
┌─ < > Block ──────────── Chemical Profile ─────────────────┐
│   Chemical ID: [_____]  C.A.S. No: [_____]   Synonym Lookup: ☐ │
│   Name: [_____]│
│ ┌────────────────── Emergency Care Protocol ────────────┐ │
│ │     ID              Protocol                           │ │
│ │  [_____]  [_____]│ │
│ │  [_____]  [_____]│ │
│ │  [_____]  [_____]│ │
│ │                                                        │ │
│ └────────────────────────────────────────────────────────┘ │
└────────────────────────────────────────────────────────────┘
```

FIG._16

< > Block ──────────── Chemical Profile ──────────
Chemical ID: [_____] C.A.S. No: [_____]  Synonym Lookup: ☐
Name: [_____]

────── Storage And Special Precautions ──────

Protocol

Storage Conditions: [_____]
Hndlng / Strg Precautions: [_____]
Other Precautions: [_____]
Personnel Sample Proc: [_____]

*FIG._17*

< > Block ──────────── Chemical Profile ──────────
Chemical ID: [_____] C.A.S. No: [_____]  Synonym Lookup: ☐
Name: [_____]

────── Spill or Leak ──────

Spill or Leak Proc: [_____]
Waste Disposal Method: [_____]
Empty Containers: [_____]

*FIG._18*

Chemical Profile

< > Block ———————— Chemical Profile ————————

Chemical ID: [ ]   C.A.S. No: [ ]   Synonym Lookup: ☐
Name: [ ]

———————— Emergency Response Protocol ————————

ID          Protocol

< > Block ———————— Chemical Profile ————————

Chemical ID: [ ]   C.A.S. No: [ ]   Synonym Lookup: ☐
Name: [ ]

———————— Transportation ————————

Pr Ship Name: [ ]
Hazard Class: [ ] [ ]
Labels Req'd: [ ]
Spec Provsn: [ ]    Exception: [ ]
Package Group: [ ]   Bulk: [ ]   Non-Bulk: [ ]
Air or Rail: [ ]    Cargo Air Only: [ ]
Vessel Stwge: [ ]   Other Stowage: [ ]

*FIG._20*

```
┌─ < >  Block ─────────── Chemical Profile ──────────────────┐
│    Chemical ID:[      ] C.A.S. No:[        ]  Synonym Lookup:☐ │
│    Name:[                                                ]  │
│ ┌──────────────── Title III List of Lists ────────────────┐ │
│ │ ──── SARA ─────────────────────────────────────────────  │ │
│ │ Section 302 Listed:  TFQ's - Lower:[     ] Upper:[    ] RQ:[ ] LB │ │
│ │                                                          │ │
│ │  302 EHS Name: [                                      ]  │ │
│ │ Section 313 Listed: ☐                                    │ │
│ │ ──── CERCLA ──────────────────────────────────────────   │ │
│ │     CERCLA RQ:[        ] LB                              │ │
│ │  No report required if release of solid metal pieces > 100 micrometers:☐ │ │
│ └──────────────────────────────────────────────────────────┘ │
└──────────────────────────────────────────────────────────────┘
```

FIG._21

```
┌─ <  Block ─────────── Chemical Profile ──────────────────┐
│    Chemical ID:[      ] C.A.S. No:[        ]  Synonym Lookup:☐ │
│    Name:[                                                ]  │
│ ┌─────────────────── Regulatory Lists ────────────────────┐ │
│ │         Lower  Upper        Other       Action          │ │
│ │ List ID  TPQ   TPQ    RQ    Qty   U/M   Req'd  Remarks  │ │
│ │ [    ]  [   ] [   ]  [  ]  [   ] [   ]  [   ]  [      ] │ │
│ └──────────────────────────────────────────────────────────┘ │
└──────────────────────────────────────────────────────────────┘
```

FIG._22

```
> Block ─────────── MSDS Definition ───────────
      MSDS ID: [      ] C.A.S. No: [       ] Reference Lookup: [    ]
   Trade Name: [                                                    ]
  Common Name: [                                                    ]
 Manufacturer: [                                                    ]
 Product Code: [              ] Date Prepared: [           ]
Component Name: [                                                   ]
         Pure: ☐  Mix: ☐  Solid: ☐  Liquid: ☐  Gas: ☐  Trade Secret: ☐
               Powder with particles < 100 microns, solution, or molten ? ☐
               Solid metal with particles >= 100 micrometers ? ☐
      Remarks: [                                                    ]
```

FIG._23

```
< > Block ─────────── MSDS Definition ───────────
      MSDS ID: [      ] C.A.S. No: [       ] Reference Lookup: [    ]
   Trade Name: [                                                    ]
  ─────────────────────── Synonyms ───────────────────────

< > Block ──── MSDS Definition ────
- MSDS ID: [ ]  C.A.S. No: [ ]  Reference Number: [ ]
- Trade Name: [ ]

── Ingredient ──
| C.A.S. # | Name | % By Wt |
|---|---|---|
|  |  |  |

FIG._26

> Block ──── Waste Definition ────
- Waste ID: [ ]  Waste Type: ☐ [ ]
- Name: [ ]
- CAS: [ ]
- DOT ID: [ ]    State Waste Code: [ ]
- Remarks: [ ]

── Waste Ingredients ──
| Remarks | Ingredient | % By Unit |
|---|---|---|
|  |  |  |
|  |  |  |
|  |  |  |

```
> Block ─────────── Waste By Location ───────────
        Waste ID: [      ] [                              ]
        Location: [              ] [                ]
              UM: [  ] [                        ]
         Max Amt: [        ]
   Ave Daily Amt: [        ]
  Longest On Site: [        ]
         Remarks: [                                        ]
```

FIG._27

```
< Block ─────────── Waste By Location ───────────
   Waste ID: [        ] [                                ]
   Location: [                                            ]
   ──────────────── Container ────────────────
   Container ID   [        ]
   Arrival Date:  [        ]    Removal Date: [        ]
   Original Qty:  [        ]    Current Qty:  [        ]
            UM:  [  ] [                              ]
   Storage Temp: ☐ [                    ]
   Storage Type: ☐ [                    ]
   Storage Press: ☐ [                    ]
       Remarks:  [                                        ]
```

FIG._28

> Block ──────────── Permit ────────────
- Permit ID: [    ] [                    ]
- Permit Type: [  ] [              ]
- Category: [  ] [              ]
- Effect Date: [      ]   Expiration Date: [      ]
- Renew By: [      ]
- Responsible: [        ] [          ]
- Costs: [      ]

FIG._29

<> Block ──────────── Permit ────────────
- Permit ID: [      ] [                    ]
- Permit Type: [  ] [              ]
- Category: [  ] [              ]

─── Permitted Emissions ───
- Waste ID: [      ] [          ]
- Quantity: [      ]  UM: [  ]
- Waste ID: [      ] [          ]
- Quantity: [      ]  UM: [  ]
- Waste ID: [      ] [          ]
- Quantity: [      ]  UM: [  ]

FIG._30

```
┌─ < >  Block ─────────── Permit ──────────────────────┐
│   Permit ID:   [      ]  [                         ] │
│   Permit Type: [  ]      [                         ] │
│   Category:    [  ]      [                         ] │
├──────────────── Permitted Devices ───────────────────┤
│        Device ID       Description                   │
│       ┌────────┐  ┌─────────────────────────────┐    │
│       │        │  │                             │    │
│       │        │  │                             │    │
│       │        │  │                             │    │
│       └────────┘  └─────────────────────────────┘    │
└──────────────────────────────────────────────────────┘
```

FIG._31

```
┌─ < >  Block ─────────── Permit ──────────────────────┐
│   Permit ID:   [      ]  [                         ] │
│   Permit Type: [  ]      [                         ] │
│   Category:    [  ]      [                         ] │
├──────────── Permitted Emission Points ───────────────┤
│        Point ID        Description                   │
│       ┌────────┐  ┌─────────────────────────────┐    │
│       │        │  │                             │    │
│       │        │  │                             │    │
│       │        │  │                             │    │
│       └────────┘  └─────────────────────────────┘    │
└──────────────────────────────────────────────────────┘
```

FIG._32

< Block ——————————— Permit ———————————
Permit ID: [ ]  [ ]
Permit Type: [ ]  [ ]
Category: [ ]  [ ]

———————————— Permitted Processes ————————————
Process ID    Description

FIG._33

> Block ——————————— Commitment ———————————
Description: [ ]
Cmmt Number: [ ]  Schedule Start: [ ]  Schedule End: [ ]
Deliverable: [ ]
Cmmt Type: [ ]  [ ]
Responsible: [ ]  [ ]
Actual Start: [ ]   Actual End: [ ]
Status: [ ]

FIG._34

```
┌─ < >  Block ──────────── Commitment ──────────────────┐
│  Description:  [                              ]       │
│  Cmmt Number: [        ] Schedule Start: [     ] Schedule End: [    ] │
│  ┌──────────────────── Phase ────────────────────────┐│
│  │ Description:  [                              ]    ││
│  │ Phase Number: [        ] Schedule Start: [     ] Schedule End: [    ] ││
│  │ Deliverable:  [                              ]    ││
│  │ Responsible:  [        ]  [              ]        ││
│  │ Actual Start: [        ]   Actual End: [        ] ││
│  │ Status:       [            ]                      ││
│  └───────────────────────────────────────────────────┘│
└───────────────────────────────────────────────────────┘
```

FIG._35

```
┌─ <  Block ──────────── Commitment ────────────────────┐
│  Description:  [                              ]       │
│  Cmmt Number: [        ] Schedule Start: [     ] Schedule End: [    ] │
│  ┌──────────────────── Phase ────────────────────────┐│
│  │ Description:  [                              ]    ││
│  │ Phase Number: [        ] Schedule Start: [     ] Schedule End: [    ] ││
│  └───────────────────────────────────────────────────┘│
│  ┌──────────────────── Activity ─────────────────────┐│
│  │ Description:   [                              ]   ││
│  │ Activity Nmb:  [        ] Schedule Start: [     ] Schedule End: [    ] ││
│  │ Deliverable:   [                              ]   ││
│  │ Responsible:   [        ]  [              ]       ││
│  │ Actual Start:  [        ]   Actual End: [       ] Status: [         ] ││
│  └───────────────────────────────────────────────────┘│
└───────────────────────────────────────────────────────┘
```

FIG._36

Waste Sites by Area

Block

Area Type: [ ] ID: [ ]

Waste Sites

Description

Priority

Waste
Site ID

Place Cursor On Desired Record and Press <Esc a> to Go to Waste Site Table

<List><Replace>

Count:0

FIG._37

Facility Inventory

Block

Area Type: ID:

Facility ID:

Report Type: Year: Report UM:

Inventory

M/C ID | CAS No | Description | EHS | UM | Max Daily | Aug Daily | Total Days

<List><Replace>

Count: 0

FIG._38

Area Inventory

Block ☐

Area Type: ____  ID: ____

Report Type: ____  Year: ____  Report UM: ____

Area Inventory Amounts Are Based On An Average Of All Facility Inventory Amounts

Inventory

| M/C | ID | CAS No | Description | EHS | UM | Max Daily | Aug Daily | Total Days |
|---|---|---|---|---|---|---|---|---|
| | | | | | | | | |

<List><Replace>

Count: 0

FIG._39

Facility Emissions

☐ Block

Area Type: [ ] ID: [_____]

Facility ID: [ ] [_____]

Permit Type: [ ] ID: [_____]

Year: [ ] From Date: [ ] To Date: [ ]

Emissions

| ID | CAS No | Description | UM | Per Period | Min | Max | Avg | Exceeds Limits |
|----|--------|-------------|----|----|-----|-----|-----|----------------|
|    |        |             |    |            |     |     |     |                |

<List><Replace>

Count: 0

FIG._40

Area Emissions

Block

Area Type: [ ] ID: [ ]

Permit Type: [ ]

Year: [ ] From Date: [ ] To Date: [ ]

Area Emission Amounts Are Based On An Average Of All Facility Emission Amounts

Emissions

| ID | CAS No | Description | UM | Per Period | Min | Max | Avg | Exceeds Goals |
|----|--------|-------------|----|----|-----|-----|-----|---------------|
|    |        |             |    |            |     |     |     |               |

Count: 0    <List><Replace>

Agencies by Area

☐ Block

Area Type: [  ]  ID: [  ]

Agencies

Agency ID | Description

Place Cursor On Desired Record and Press <Esc a> to Go to Agency Table

Count:0    <List><Replace>

Agency Requirements

☐ Block

Agency ID: [____]

For Recording all Reports, Permits, Licenses and other Regulatory Requirements

Requirements

| Req Category | Req Type | Description |
|---|---|---|
| [____] | [____] | [____] |

<List><Replace>

Count: 0

FIG._43

☐ Block ———— Emergency Response Protocols ————

Area Type: ▯ ID: ▯

Agency ID: ▯

Facility ID: ▯

Resp Action: ▯

———— Protocols ————

Description

Protocol
Code

Place Cursor On Record and Press <PgDn> To See Protocol Text

FIG._44

Count:0      <List><Replace>

Emergency Response Staffing

☐ Block

Area Type: ___ ID: ___

Agency ID: ___

Facility ID: ___

Staffing

Resp Action: ___

| Employee ID | SSN | Name | Volunteer Code | Day | Shift Code | |
|---|---|---|---|---|---|---|

<List><Replace>

Count: 0

FIG._45

☐ Block ——————— Emergency Response Equipment ———————

Area Type: [    ] ID: [    ] [                    ]
Agency ID: [    ] [                    ]
Facility ID: [    ] [                    ]

——————— Equipment ———————

Equip Type: [    ] [                    ] No On Hand: [  ]
Location: [    ] [                    ]

| Equip ID | Description | Manufacturer | Model No | Serial No | Status Code |
|---|---|---|---|---|---|
| [ ] | [ ] | [ ] | [ ] | [ ] | [ ] |

Count: 0                                    <List><Replace>

FIG._46

Emergency Response Action

☐ Block

Area Type: _____
Facility ID: _____
Emerg ID: _____
Emerg Status: __

Remarks: _____

Response Actions

| Response Action | Description | Action Start | Action End | Agency ID | Status Code |
|---|---|---|---|---|---|
|  |  |  |  |  |  |

<List><Replace>

Count: 0

FIG._47

Emergency Notification

Block ☐

Area Type: [ ]   ID: [ ]
Agency ID: [ ]
Facility ID: [ ]

Notification

Emerg ID: [ ]   Emergency Type: [ ]
Emerg Date: [ ]   Description: [ ]
Notificat Date: [ ]   Time: [ ]   Notified By: [ ]
Title: [ ]   Phone: [ ]   Ext: [ ]
Haz Material: [ ]   Qty: [ ]   UM: [ ]
Total Days: [ ]   Hrs: [ ]   Min: [ ]   Remarks: [ ]

Count: 0   <List><Replace>

Compliance History By Facility

Block ☐  
Facility ID: _____  
Agency ID: _____

Compliance History

| Compliance Action | Description | Scheduled Date | Actual Date | Resolution Date | Status Code |
|---|---|---|---|---|---|

Place Cursor On Desired Record and Press <Esc b> to Go to Compliance Action Table <List><Replace>

Count:0

FIG._50

```
┌─────────────────────────────────────────────────────────────┬──┐
│ □ Block ─── Permits By Facility ──────────────────────────  │  │
│                                                             │  │
│  Facility ID: [                    ]                        │  │
│                                                             │ <│
│  Agency ID:  [                    ]                         │ L│
│                                                             │ i│
│ ├─── Permits ──────────────────────────────────────────┤    │ s│
│                                                             │ t│
│  Permit      Permit                        Status          │ >│
│  Type        ID         Description        Code            │ <│
│  ┌──────┐   ┌──────┐   ┌─────────────────┐ ┌──────┐         │ R│
│  │      │   │      │   │                 │ │      │         │ e│
│  │      │   │      │   │                 │ └──────┘         │ p│
│  │      │   │      │   │                 │                  │ l│
│  │      │   │      │   │                 │                  │ a│
│  └──────┘   └──────┘   └─────────────────┘                  │ c│
│                                                             │ e│
│  Place Cursor On Desired Record and Press <Esc f> to Go to Permit Table │ >│
└─────────────────────────────────────────────────────────────┴──┘
 Count:0
```

FIG._51

Permit Applications By Facility

Block

Facility ID:

Agency ID:

Permit Applications

Permit Application Type

Permit Application ID

Description

Status Code

Place Cursor On Desired Record and Press <Esc a> to Go to Permit Application Table <List><Replace>

Count: 0

Facility Invoices

Block

Area Type:
Agency ID:
Facility ID:
Rqmt Type:

Invoices

Invoice No
Reqmt ID
Description
Fee Amount$
Invoice Amount$
Date Assessed
Paid

To Go To the Fee Payment Table, Press <Esc c>

Count:0  <List><Replace>

FIG._54

Fees by Requirement Type

☐ Block

Area Type: ____
Agency ID: ____
Rqmt Type: ____

Fees

| Fee Type | Description | Fee Amount$ | Assess Every | Unit Time | Minimum Payment$ |
|---|---|---|---|---|---|

To Go To the Facility Invoices Table, Press <Esc c>

Count: 0    <List><Replace>

FIG._55

INTEGRATED HAZARDOUS SUBSTANCE TRACKING AND COMPLIANCE

FIELD OF THE INVENTION

This patent application is a Continuation In Part of a previously-filed patent application (U.S. Ser. No. 07/844,225, filed 2 Mar. 1992). This invention relates to automation, integration, management and regulatory review of environmental, health and safety information as it pertains to manufacture, process, use, handle, and/or transport of chemical products and/or by-product wastes that are considered hazardous to humans or to the environment.

BACKGROUND OF THE INVENTION

Monitoring or tracking of the receipt, handling and disposition of hazardous substances in the workplace is now standard in most businesses that handle one or more such substances. Such tracking often requires submission of prescribed reports to an appropriate federal state or local agency monitors compliance with the workplace standards. Many software packages and associated protocols deal with individual or narrowly defined groups of tasks, such as preparation and promulgation of Materials Safety Data Statements (MSDSs), monitoring of accumulation and disposal of hazardous wastes, and the like. These packages do not offer an integrated package that deals with all regulatory aspects or that provides a compatible interface for monitoring of compliance activities by a regulatory agency.

Generation and use of hazardous substances in the United States has grown steadily in the last 45 years and is now estimated to be about 270 million metric tons per year. According to one definition, a "hazardous substance" is any substance or mixture of substances that may cause substantial personal injury or substantial illness during or as a proximate result of any customary or reasonably foreseeable handling or use, including reasonably foreseeable ingestion by children, if the substance: (1) is a toxic agent or reproductive toxin; (2) is corrosive; (3) is an irritant; (4) is a strong sensitizer; (5) is flammable, combustible or explosive; (6) is pyrophoric; (7) is a carcinogen, hepatotoxin, nephrotoxin or neurotoxin; (8) is an agent that acts on the hematopoietic system; (9) is an agent that damages the lungs, skin, eyes or mucous membranes; (10) is a compressed gas; (11) is an organic peroxide; (12) is an oxidizer; (13) is unstable, reactive or water-reactive; (14) generates pressure through decomposition, heat or other means; (15) is sufficiently radioactive to require labeling as such; (16) is a toy or other article intended for use by children and presents an electrical, mechanical or thermal hazard; or (17) is specially listed as a hazardous substance by a state or federal agency having jurisdiction over such substances.

At the federal level, special purpose hazardous substance laws and regulations, focusing on a particular hazardous substance or narrow class of such materials, have been applied for more than a century. In 1866, a federal law regulating transportation and storage of explosive and flammable materials was promulgated. This was followed in 1899, 1910, 1938, 1944 and 1947 by passage of the Refuse Act, the first Insecticide Act, the Food, Drug and Cosmetic Act, the Safe Drinking Water Act, and the Insecticide, Fungicide and Rodenticide Act, respectively. In 1955 and 1966, the Clean Air Act and the Federal Hazardous Substances Act appeared, respectively. Since 1969, the pace of introduction of new laws regulating hazardous substances has increased, and approximately 15 new major federal laws and voluminous regulations have been introduced in this area. These laws often have overlapping jurisdiction and are not always consistent with one another. Several states, such as California, have passed their own hazardous substance laws before the corresponding federal hazardous substance laws were adopted. These laws still apply in those states and in many cases supersede their Federal counterparts.

The Safe Drinking Water Act ("SDWA"), originally passed in 1944 and amended several times since then, covers all drinking water supplies in all states. Primary standards, to prevent adverse effects on human health, and secondary standards and covering certain aesthetic effects such as odor and turbidity of processed drinking water, are set down in terms of maximum permissible concentrations of specified contaminants in water delivered to any public drinking water system. From a regulatory standpoint, SDWA falls under the broader mandate of the Clean Water Act (CWA), whose ultimate goal is maintenance of the "chemical, physical, and biological integrity of the nation's waters."

CWA, with its most recent amendment, the Water Quality Act (WQA) of 1987, establishes mandatory effluent limitation guidelines for all facilities which discharge waste into water bodies, or allow waste to enter and potentially contaminate subsurface water sources, like aquifers. CWA created the National Pollutant Discharge Elimination System (NPDES) to regulate effluents, influents (waterborne wastes received by a treatment facility) and sludge. The primary enforcement mechanism of NPDES is the NPDES permit. CWA directs control authorities at the federal and state level to administer and enforce permit compliance. NPDES permits include terms and conditions ranging from required monitoring of point source discharges to the implementation of control technologies to minimize outfall.

The Clean Air Act ("CAA"), passed in 1955 and amended several times since that time (most recently, in 1990), covers emission of pollutants into the ambient air and atmosphere. This may include hazardous wastes that are liquid or gaseous when discharge occurs. National Ambient Air Quality Standards ("NAAQSs") are set forth for seven chemicals or chemical groups: $SO_x$, CO, $NO_x$, $O_3$, Pb, hydrocarbons and total suspended particulates. Additionally, emission standards are set forth for asbestos, beryllium, mercury and vinyl chloride. Primary Standards are set forth to protect human health, and Secondary Standards are set to protect or limit damage to other entities, such as flora, fauna and personal and real property. The federal government in effect delegates responsibility to achieve these standards to the individual states, which are required to present and implement State Implementation Plans to achieve the target air quality standards in various identified air basins in the states.

The primary enforcement mechanism of CAA is the CAA permit. Permits covering emission source construction, modification, and operation follow the NPDES scheme, adopting strict measures for controlling and reducing emissions of airborne waste at the source. CAA permits include terms and conditions ranging from the application of abatement devices and other control technologies for emission reduction, to required monitoring at all source emission point sources and non-point sources (i.e., fugitive emission locations). Permits based on economic incentive strategies, such as marketable emission allowances, were added to the federal regulatory program maze under the 1990 amendments. Although these additions were intended to stimulate compliance via market-based vehicles (like emission allowance futures trading), these permits have not, as yet, been broadly implemented.

The Toxic Substances Control Act ("TSCA"), originally passed in 1965, together with the Federal Hazardous Substances Act ("FHSA") passed in 1966 and the Resource Recovery Act ("RRA") passed in 1970, were the initial federal laws governing generation and handling of toxic and other hazardous substances. Most provisions of the RRA and the FHSA have been incorporated in the Resource Conservation and Recovery Act, discussed below. Under TSCA, the Environmental Protection Agency ("E.P.A.") reviews any chemical substance that is or will be produced in sufficient quantity that it may cause significant acute or chronic human exposure. Testing is performed with respect to human health and the environment and focuses particularly on possible risk of serious harm to humans from (1) cancer, (2) genetic mutations and (3) birth defects. If the EPA finds that the risk to human health or to the environment is sufficiently great, the EPA may: (1) limit the amount of the chemical to be manufactured or used; (2) prohibit a particular use; (3) require placement of warning labels on all containers of the chemical; (4) require placement of public notices of use; and (5) regulate commercial use and/or disposal of the chemical.

Any person, including a company, that manufactures or imports more than 10,000 pounds or more of a chemical named on an E.P.A. Chemical Substances Inventory List is subject to the reporting requirements under TSCA. These reporting requirements include: (1) updating of a list of all chemicals present on a site, at four-year intervals or more frequently; (2) submission (to the E.P.A.) of a Pre-manufacture Notice and relevant test data for any new chemical, at least 90 days before manufacturing or importing the chemical; (3) submission of a Notice Of Intent To Import or To Export a listed chemical, within seven days after entering into a contract to import or export the chemical, if the chemical is known to be mutagenic, teratogenic or carcinogenic or is known to cause chronic health or environmental problems; (4) reporting of a significant new use for a chemical already on the E.P.A. list; (5) reporting of known significant adverse reactions caused by handling or discharge of any chemical used by the reporting entity; (6) submission of any unpublished health and/or safety studies on certain chemicals used by the reporting entity; (7) notification of any substantial risk of injury to human health or the environment, due within 15 days after the reporting entity first receives information on the risk; (8) submission of information on production of, use of and exposure to certain chemicals to an Interagency Testing Committee for analysis by the Committee; (9) submission of specified comprehensive information on a fixed format reporting form; (10) submission of results of tests, if any, performed by the reporting entity on certain heptahalogenated dibenzo-p-dioxins and dibenzofurans, within 90 days after a test, if a positive result is obtained; and (11) submission of a Notification of PCB Activity form by any storer, transporter or disposer of polychlorinated biphenyl ("PCB") waste. TSCA also sets forth certain requirements for labelling of, disposal of and recordkeeping for certain chemicals, such as PCBs.

The Occupational Safety and Health Act ("OSHA"), passed in 1970, covers the conditions under which employees work. The regulations issued under OSHA make this Act among the most detailed of all workplace laws. The relevant parts of OSHA prescribe standards for the protection and welfare of employees exposed to workplace hazards. An employer must establish a written hazard communication plan to advise its employees of hazards associated with chemicals the employees handle, and incorporate into this plan the use of container labels, warning signs, Material Safety Data Sheets ("MSDSs") and training programs. The centerpiece of the OSHA Hazard Communication Standard is the MSDS, required for each hazardous substance manufactured or used on the site. The MSDS includes all relevant information pertaining to a hazardous substance, from its ingredients to physical properties, health hazards, exposure limits, storage incompatibilities, safe handling and use precautions and much more. An employer must report, within 48 hours, any incident that results in a fatality, or in hospitalization of five or more employees. The OSHA Log and Summary of Occupational Injuries and Illnesses form is used to record all work-related injuries and illnesses for each calendar year. Many such records must be maintained by the employer for the duration of employment of an employee, plus 30 years. An employer must develop and implement a written emergency plan and make the plan available in the workplace, whenever an OSHA standard requires it. An employer must also develop and implement a written safety and health program and a medical surveillance program for employees involved in hazardous waste operations, including emergency response procedures.

The Occupational Health and Safety Administration ("O.S.H.A.") under the Department of Labor (D.O.L.) develops and enforces all OSHA standards. The O.S.H.A. primary enforcement activity is the inspection, or audit procedure. Facilities covered by one or more OSHA standard are subject to voluntary (routine) inspections, as well as non-voluntary inspections based on a warrant to search.

The Hazardous Materials Transportation Act ("HMTA"), passed in 1974, is administered jointly by the Department of Transportation ("D.O.T."), established in 1966, and the E.P.A., established in 1969. The HMTA sets forth 15 hazard classes of materials (e.g., flammable liquids, high explosives, poisons) plus five classes of "other regulated materials" and sets forth laws and corresponding regulations on: (1) identification, listing, labelling and placarding of these hazardous substances; (2) recordkeeping requirements for handling these hazardous substances, including Uniform Hazardous Material Manifests for shipment of hazardous wastes; (3) requirements for generators and transporters of hazardous substances and for owners and operators of specially defined treatment, storage and disposal facilities ("TSDFs") for these hazardous substances; (4) permit and pre-transport notification requirements and transportation routing for all facilities that generate or transport these hazardous substances; (5) requirements for tracking the movement of these hazardous substances; (6) containers to be used for transport; (7) incident notification and other procedures for handling and reporting accidental and intentional discharges of hazardous substances; and (8) testing and standards for operators of transport vehicles for hazardous substances. Hazardous wastes and other hazardous substances are not distinguished under the HMTA. A "generator" of a hazardous waste is defined simply as "any person whose act first causes a hazardous waste to become subject to regulation". Transportation modes covered include movement of the hazardous substance by air, rail, water and highway. The D.O.T. is authorized to inspect generator and transporter facilities, vehicles and records to insure compliance.

The Resource Conservation and Recovery Act ("RCRA"), passed in the present form in 1976, was originally part of the Clean Air Act, passed in 1966. The RCRA establishes "cradle-to-grave" responsibility for hazardous solid waste handled by a generator, by a TSDF operator, or by a hazardous waste transporter or recycler. Under RCRA, a solid waste is a "hazardous waste", if: (1) the waste arises from specified manufacturing practices; (2) the waste is one of a group of specified wastes; (3) the waste contains any of a group of specified chemicals; or (4) the waste has specified toxicity, chemical reactivity, ignitability or corrosive characteristics. Household wastes are generally exempted from RCRA coverage. Generators of more than 1,000 kilograms per month of ordinary hazardous wastes or of more than 1 kgm per month of extremely hazardous waste must operate under a RCRA permit covering registration, container labelling, recordkeeping and other requirements. "Small quantity generators", who generate 100–1,000 kgms per month of hazardous wastes and no more than 1 kgm per month of extremely hazardous wastes, are covered by simpler requirements. Generators of still smaller amounts of the hazardous wastes or the extremely hazardous wastes are often exempt from regulation under RCRA.

The goals of RCRA include: (1) protecting the health, safety and environment of the public; (2) regulating the generation, treatment, disposal and storage of hazardous wastes; (3) reducing environmental pollution from waste disposal; (4) encouraging recycling and/or re-use of hazardous wastes; and (5) eliminating certain landfill and other solid waste disposal practices. A Notification of Hazardous Waste Activity must be submitted by a generator, transporter or operator of a hazardous waste TSDF to apply for an E.P.A. identification number and for any applicable E.P.A. permits for on-site treatment, storage or disposal. Hazardous waste generators are required to conduct their own studies to determine if a specific hazardous waste can be treated to reduce its volume or toxicity, with records of such studies being submitted each year to the E.P.A. and being maintained for three years.

A Uniform Hazardous Waste Manifest, developed by the E.P.A. under RCRA and under HMTA, must be used by persons who transport hazardous waste for off-site treatment, storage or disposal, and a copy of each Manifest must be maintained as part of a facility's operating record. Owners or operators of a TSDF who receive hazardous waste without a proper Manifest must submit an Unauthorized Waste Report to the E.P.A. within 15 days after such an incident occurs. Upon closure of a hazardous waste facility, records of hazardous waste disposal and the amounts thereof must be submitted to the E.P.A. and to local land use control authorities.

A hazardous waste generator must demonstrate that it has the financial ability to cover liability claims involving sudden or non-sudden discharges from the facility. An owner or operator must monitor and inspect all on-site tanks that treat or accumulate hazardous waste. A spill or other discharge must be reported to the National Response Center "N.R.C.") within 24 hours after the incident occurs, and a detailed report on such incident must be submitted to the E.P.A. within 30 days after the incident. RCRA is enforced concurrently with applicable state statutes.

The Comprehensive Environmental Response, Compensation and Liability Act "CERCLA") was passed in 1980 in response to the discovery of several hazardous waste disposal sites that would have to be cleaned up at government expense. CERCLA was intended to: (1) provide a system for identifying and cleaning up chemical and hazardous substance releases; (2) establish a fund to pay for cleanup of release sites, where those responsible cannot or will not pay for the cleanup; and (3) enable the federal government to collect the costs of cleanup from the responsible parties. The federal government set aside $1.8 billion in the first Superfund for hazardous waste site clean-up purposes. CERCLA includes on its hazardous substance list all hazardous wastes under RCRA, all hazardous air pollutants regulated under the CAA, all water pollutants regulated under the CWA, and most substances regulated under TSCA.

In 1986, the Superfund Amendments and Reauthorization Act ("SARA") added another $6.2 billion to the Superfund for clean-up purposes. SARA also enacted Community-Right-to-Know requirements into law. Title III of SARA contains the Community Right-to-Know requirements and provides for: (1) Emergency Response Planning; (2) Accidental Release Notification; (3) Facility Hazardous Substance Inventory Reporting; and (4) Facility Toxic Substance Release Reporting.

Sections 301–303 of Title III enacted the requirement for Emergency Response Planning. Emergency Response Planning as enacted by SARA required the creation of committees at both State (State Emergency Response Committee, or S.E.R.C.) and Local (Local Emergency Planning Committee, or L.E.P.C.) levels. Owner/operators of facilities with specified hazardous substances on site in quantities in excess of specified thresholds are required to prepare and submit Emergency Response Plans to the L.E.P.C. having jurisdiction over the facility. Elements of the facility Emergency Response Plan include: (1) identification of Emergency Response procedures to be used for action on the site and for areas surrounding the site; (2) identification of a facility co-ordinator for implementing the plan; (3) procedures to be used during emergencies for notifying authorities and potentially affected parties; (4) methodology for determination when a release has occurred and the probable area and population at risk; and (5) description of Emergency Response assets that are in place as well as the contact point for the Emergency Response assets.

Section 304 of Title III requires preparation and filing of an Accidental Release Notification report whenever an accidental release of a specified hazardous substance occurs in which (1) the substance crosses the facility boundaries or is released in transport on public roads, and (2) the release amount exceeds specified thresholds. This report must address: (1) actions taken to contain or respond to the release; (2) any known or anticipated acute or chronic health risks associated with the release; and (3) advice regarding medical attention required for any exposed individuals.

Section 311 and 312 of Title III provide for facility hazardous substance inventory reporting. Facility hazardous substance inventory reporting is required if substances for which an MSDS is required under OSHA are present in quantities in excess of specified thresholds. Facilities subject to hazardous substances inventory reporting requirements must: (1) produce a listing of specified hazardous substances present at the facility or an MSDS for each specified hazardous substance; and (2) an emergency and hazardous chemicals inventory report form. Both reports (listing/MSDS and inventory report) must be submitted to the following agencies: (1) L.E.P.C.; (2) S.E.R.C.; and (3) local Fire department.

Section 313 of Title III requires the E.P.A. to establish an inventory of toxic chemical emissions from certain facilities. To do so, the E.P.A. requires owners and operators of facilities that manufacture, import, process, or use specified toxic chemicals to report annually their releases of those chemicals to any environmental media. Releases to air, water, and land, and releases to off-site locations such as publicly owned treatment works or hazardous waste disposal sites, must be estimated and reported under Section 313. Both routine and accidental releases must be reported. Facilities must report even if their releases comply with all environmental laws and permits.

The Pollution Prevention Act ("PPA"), passed in 1990, requires hazardous waste generators and other similar facilities that manufacture, import, process or otherwise use listed toxic chemicals to annually report releases of any of these chemicals to any environmental medium (atmosphere, water, soil and biota). For each listed chemical that is reported, the generator must provide: (1) the quantity of the chemical that is released (before recycling, treatment or disposal) into a waste stream and the change, if any, from release in the preceding year; (2) the quantity of the chemical, if any, that is recycled or treated at the facility or elsewhere, the percentage change from the preceding year and the method(s) of recycling or treatment used; (3) the source reduction practices adopted by the generator and the quantitative method(s) used to monitor these practices, with these practices being reported in the categories of (a) equipment, technology, process or procedure modifications, (b) reformulation or redesign of the products, (c) substitution of input materials and (d) improvement in management, training, inventory control, materials handling or other administrative practices; (4) quantities of the chemical, if any, that are released in one-time events not associated with production processes; (5) quantities of the chemical expected to be released into a waste stream or to be recycled in each of the two immediately following years; and (6) a ratio or other quantitative comparison of production of the chemical between the current and preceding reporting years. Much of this information would be reported on a revised Form R under SARA Title III for each listed chemical.

The above legislation, with its demanding regulatory requirements, has created a need for sophisticated information management solutions to assist industry and other impacted entities in the compliance process. In recent years, software applications have emerged that attempt to manage selected aspects of compliance, such as MSDS or Hazardous Waste Manifest information. The limited scope of these applications, coupled with the limitations of the software supporting such applications, has led to a plethora of limited solutions.

Some applications that have attempted a "comprehensive" approach, attempt to manage all aspects of environmental compliance by grouping together several mini-applications or modules. Managing the universe of environmental compliance information requires management of the compliance reports as well as the information from which the compliance reports were prepared. In many instances, the information is tightly interrelated. As an example, an accidental release of Parathion at a facility where it is manufactured has environmental as well as health & safety consequences. The information that results from the release is critical for the accurate preparation of regulatory agency reports. Invariably, each accident requires reporting to two or more regulatory agencies; each regulatory agency is responsible for a different element of the accident. No capability exists to share information between different functions from a common information store or to manage the information dynamically. These application packages that claim a "comprehensive" approach, are in reality, fragmented and offer no synergistic advantages over their component parts.

Inventory management systems currently available tend to be of two varieties. A first variety ignores most or all effects of, and responsibilities under, the hazardous substance laws and regulations and merely tracks the amount of a chemical present in inventory, in work-in-process and in finished products, with no particular attention being paid to loss or unintended discharge of a portion of the chemical during manufacturing with, or transportation of, the chemical. A second variety focuses on a few of the functions of inventory control, manufacturing, waste disposal, etc. and accounts for a few, but not all, of the applicable hazardous substance laws.

For example, AV Systems offers a plurality of stand-alone modules for hazardous substance reporting. The MSDS+ System from AV Systems is designed for O.S.H.A. Hazards Communications Standard compliance, preparation of MSDSs and the associated warning labels, and tracking of employee training. Form R covers toxic release inventory reporting under SARA Title III and multi-year comparisons for PPA reporting. VOC tracks air permits and emissions. WASTE tracks cradle-to-grave waste handling and reporting. INVENTORY records chemical inventory transactions. A LOCASL module offers compliance procedures for compliance with state and local rules.

Envirogenics CHEM Master provides a database on 4700 of the most commonly used hazardous substances and D.O.T. Emergency Response guidelines; and WASTE db tracks waste materials, provides an historical record of treatment, storage and disposal activities by TSDFs, and prints state-specific waste manifests.

CHEMMIX offers several programs that determine chemical incompatibilities and potential adverse reactions based upon fire, explosion, heat, toxic gas emission, violent polymerization, flammability, etc.

ERM Computer Services' Enflex Data provides 16 separate modules covering facilities description, chemical inventories, SARA Title II Form R reporting, container and permit tracking, and water and air data.

General Research FLOW GEMINI provides hazardous substance report generation, using a blank screen on which the user designs the reporting forms to be used. Some standard report forms are included with this software.

Imagetrak Software's MSDS ExPress allows scan-in of MSDS images, which are then attached in an unspecified way to a data base record. Information contained on the scanned-in MSDSs can then be queried in a simple question and answer format.

J & H Software offers Process Adviser/NPDES Reporter, which allows management of process data for a waste treatment facility, including solids balances, percent removal and statistical analyses of plant operation parameters.

Jordan Systems' Hazardous Material Manager allows coordination of SARA Tier I, Tier II and Form R Reports, as well as MSDS tracking.

North American Software provides several individual modules for hazardous substance management, including: HAZARD Basic Manifest Management System for E.P.A. Uniform Hazardous Waste Manifest tracking; Hazard Basic Waste Tag Management System for report generation based on waste container tags; HAZARD Basic Operation Log Management System for report generation based on activity tags; and HAZARD MSDS Document Management System for creating a database for hazardous substance document images.

OSHA-SOFT's Compliance Manager provides a link between MSDSs and chemical inventory information, to facilitate compliance with the O.S.H.A. Hazards Communication Standard.

All of the above software packages appear to afford detailed treatment of individual hazardous substance management activities without sharing of information between modules. What is needed is an integrated hazardous substance management system that can:

(1) Provide a pure chemical, chemical mixture and/or waste profile for each hazardous substance on-site;

(2) Track the amount and location of each hazardous substance present on-site through an entire manufacturing process, including spillage, leakage and/or unintentional release of any portion of the chemical;

(3) Track all non-process releases, whether accidental or routine, of hazardous substances into the environment;

(4) Generate and archive all records and changes in the records required under applicable federal and state hazardous substance laws;

(5) Track exposure of each worker to each hazardous substance and determine if and when a worker's exposure to a particular chemical should be curtailed;

(6) Generate all documents and reports, such as material safety and data sheets and hazardous waste manifests, required for compliance under the hazardous substance laws and regulations;

(7) Track all events related to accidents involving hazardous substances in the workplace;

(8) Manage all records necessary for day-to-day compliance;

(9) Provide a framework for planning responses for, and responding to, actual unplanned hazardous substance releases; and

(10) Provide a framework for regulatory oversight by a responsible agency of one or more regulated facilities or for self-tracking and compliance by a regulated facility.

SUMMARY OF THE INVENTION

These needs are met by the invention that, in one integrated system, provides eight functional groupings and a relational database schema or database design that integrates three, four, five, six, seven or eight of these functional groupings and allows them to share or exchange information on hazardous substances for in-house and regulatory compliance-related functions.

A Hazardous Materials Index ("HMI") functional grouping provides static information management regarding hazardous materials (pure chemicals, chemical mixtures and wastes) in the workplace. Users can produce a variety of reports, for internal and regulatory compliance purposes, from the information that is managed by the HMI functional grouping. The HMI grouping maintains dynamic links with the HMM grouping, the HPM grouping, the HRM grouping, the HWM grouping, the HCM grouping, the EMF grouping and the FMF grouping that are discussed below. The benefit of the dynamic linkage is that real-time information transfer between functional groupings can occur, resulting in up-to-the-second information availability.

A Hazardous Materials Management ("HMM") functional grouping provides dynamic information management regarding movement of hazardous materials (again, pure chemicals, chemical mixtures, and wastes) throughout the workplace. This includes tracking movement of hazardous materials that commences with the receipt of hazardous materials and continues through to the transfer of waste from a process or non-process activity. Dynamic links are maintained between the HMM functional grouping and the HMI, HPM, HRM, HWM, HCM, EMF and FMF functional groupings. As an example, the dynamic link between HMM and HMI supports the real-time transfer of chemical by location information from HMM to HMI. As a consequence, the HMI grouping can be immediately updated with chemical by location information as soon as the location transfer transaction is entered into the HMM grouping.

A Hazardous Permit Management ("HPM") functional grouping provides for management of data relevant to an organizations' hazardous materials permits. The HPM grouping maintains data on point source and non-point source (i.e., fugitive) releases covered by permits. These data can be related to the permitted release level for determination of whether or not a "permit exceedance" has occurred. Dynamic links are maintained between the HPM functional grouping and the HMI, HMM, HWM, HCM, EMF and FMF functional groupings and may be maintained for limited purposes with the HRM grouping. A dynamic linkage may also be maintained between the HPM and HRM functional groupings. As an example, the dynamic link between HPM and HMM supports the real-time transfer of release by source information from HMM to HPM. As a consequence, the HPM grouping can be immediately updated with point source release information as soon as the process operation transaction is entered into the HMM grouping.

A Human Resource Management ("HRM") functional grouping provides for management of data relevant to an organization's human resource as it relates to hazardous materials in the workplace. Examples of information managed by the HRM functional grouping would be employee hazardous materials training, employee medical monitoring and employee hazardous materials accident/illness reports. Dynamic links are maintained between the HRM functional grouping and the HMI, HMM, HWM, HCM, EMF and FMF functional groupings. As an example, the dynamic link between HRM and HMI supports the real-time query of data maintained by the HMI functional grouping prior to completion of a HRM functional grouping transaction. This becomes critical when an employee is about to be assigned to a location in which chemicals are present to which the employee can not be exposed. Management actions can be taken proactively to avoid assigning the employee to the prohibited location, thus avoiding or limiting future liability for employee illness or disability.

A Hazardous Commitment Management ("HCM") functional grouping provides for management of data relevant to hazardous materials-related commitments of an organization. Dynamic links are maintained between the HCM functional grouping and the HMI, HMM, HPM, HRM, HWM, EMF and FMF functional groupings. As an example, the dynamic link between HCM and HMI groupings supports the real-time transfer of regulatory agency reporting due dates along with progress toward meeting the reporting due dates. As a consequence, the HCM grouping can be immediately updated with compliance reporting completion information as soon as the final version of the compliance report is run.

A Hazardous Waste Management ("HWM") functional grouping provides for management of data elements related to the organizations' generation of waste. Dynamic links are maintained between the HWM functional grouping and the HMI, HMM, HCM, HRM, HPM, EMF and FMF functional groupings. As an example, the dynamic link between the HWM and HMM groupings provides information on the generation of waste as an output from the production process as soon as the production process transaction is committed. Execution of the waste generation transaction will trigger an immediate update of the HWM grouping and will begin the countdown of the 90 day RCRA calendar for wastes accumulated on site without a permit.

An Emergency Management Function ("EMF") functional grouping provides for planning for response to, and monitoring the response to, spills and emissions of hazardous substances, including personnel training, emergency care, decontamination and notification of relevant regulatory agencies. Information entered in the HMI, HMM, HPM, HCM and/or FMF groupings, as well as information entered directly into the EMF grouping, is used to determine initial responses to simulated or actual chemical spills and emissions and to prepare required reports and notifications for the cognizant regulatory agencies. As an example, the dynamic link between the EMF and HPM groupings allows management to review the permitted emissions of a given substance allowed by a site permit and to determine if the actual emissions for that substance are likely to exceed the emissions permitted under the permit, either in day-to-day operations or as a result of a spill or other unplanned event.

A Facility Management Function ("FMF") functional grouping can be used by a regulatory agency to track receipt of permit applications and dispositions, hazardous substance operations compliance, hazardous substance reports, release (spills, emissions) notifications and cleanup activities, and other related regulatory activities, classified by business name, by business site or facility, by class of activity, and by any other suitable classification. The FMF grouping may be linked with the HMI, HMM, HPM, HCM, HWM and/or EMG groupings to provide a regulatory agency or regulated facility with information needed to assess compliance by a regulated facility with notification, tracking, permit application and other requirements.

All actions of the above functional groupings are coordinated by the relational data base management system schema that links and fuses the respective individual functional groupings into an information management solution that provides a capability much greater than the sum of the individual parts.

BRIEF DESCRIPTION OF THE DRAWINGS

FIG. 1 is a schematic view of the eight functional groupings and data base link between these eight groupings included in the system according to the invention.

FIG. 2 illustrates the exchange of information between functional groupings according to one embodiment of the invention.

FIGS. 3 and 4 are schematic views illustrating operation of the invention at a multi-site manufacturing business.

FIGS. 5–22 illustrate one version of computer screen displays, presented to a user, containing information on the Chemical Profile Function used in the invention.

FIGS. 23–25 illustrate one version of computer screen displays, presented to a user, containing information on the MSDS Definition Function used in the invention.

FIG. 26 illustrates one version of computer screen display, presented to a user, containing information on the Waste Definition Function used in the invention.

FIGS. 27–28 and 37 illustrate one version of computer screen displays, presented to a user, containing information on the Waste By Location Function used in the invention.

FIGS. 29–33 illustrate one version of computer screen displays, presented to a user, containing information on the Permits Function used in the invention.

FIGS. 34–36 illustrate one version of computer screen displays, presented to a user, containing information on the Commitments Function used in the invention.

FIGS. 38–48 illustrate one version of computer screen displays, presented to a user, containing information on the Emergency Management Function used in the invention.

FIGS. 49–55 illustrate one version of computer screen displays, presented to a user, containing information on the Facility Management Function used in the invention.

DETAILED DESCRIPTION OF THE INVENTION

FIG. 1 provides a schematic overview of the system, which is organized into seven or eight functional groupings in particular embodiments: (1) a Hazardous Materials Index ("HMI") grouping 11; (2) a Hazardous Permit Management ("HPM") grouping 21; (3) a Hazardous Materials Management ("HMM") grouping 31; (4) a Human Resource Management ("HRM") grouping 41; (5) a Hazardous Waste Management ("HWM") grouping 51; (6) a Hazardous Commitment Management ("HCM") grouping 61; (7) an Emergency Management Function ("EMF") grouping 71; (8) a Facility Management Function ("FMF") grouping 81, operated by a regulatory agency or regulated facility; and (9) a relational database schema or database design 91 that links and fuses the many or all of functional groupings into a single, integrated entity.

The HMI functional grouping 11 is the hazardous substance information management foundation of the invention. The HMI grouping 11 manages and tracks information on all hazardous substances on site, whether these substances are pure chemicals, mixtures of chemicals, or mixtures of mixtures (as in mixtures of compatible by-product wastes), and provides information used in planning for responses to unscheduled releases of hazardous substances. Within the HMI grouping 11, pure chemicals and mixtures are profiled according to their chemical names and synonyms, designated hazard categories, exposure limits, emergency response and emergency care protocols, physical properties, compliance planning, reportable quantity levels, health hazard symptoms, chemical reactivity, handling precautions, etc. The comprehensiveness of the HMI grouping 11 is a central feature of the invention.

The HMI functional grouping 11 enables users to define all MSDS-documented materials received and to track or record the location(s) and amount(s) of these materials on the site. Using document image processing technology, the HMI grouping 11 allows users to enter and store images of actual MSDSs. These images may be converted to text, using optical character recognition technology, and transferred to the database 91. MSDS-documented materials defined in the HMI grouping 11 are utilized for dynamic management of chemical inventory supported in the HMM grouping, and for reference in emergency response to spills and emissions in the EMF grouping 71. The MSDS definition structure is complemented by a waste definition structure that allows users to define wastes generated on-site, their components, characteristics, properties, average quantities and waste containers. These waste definitions may be utilized in the HWM grouping 51 to monitor waste accumulation and to generate Hazardous Waste Manifests for off-site transport of such wastes.

All substance information managed in the HMI grouping 11 is organized according to facility and location parameters defined by the user. Location codes are provided to enable users to identify all storage and on-site processing locations and to track all hazardous wastes for reporting purposes. The HMI grouping 11 calculates quantities, converts units of measure and lists the exposure thresholds and related requirements for each on-site hazardous substance. The HMI grouping 11 can also generate the SARA Title III Tier One and Tier Two Reports, the Toxic Release Inventory report (E.P.A. Form R), the CERCLA, SARA Title III and RCRA Release Notification (spill) reports, the D.O.T. Hazardous Materials Incident Report, and all relevant state and local reports as defined by the user.

The HMM functional grouping 21 expands upon the identification of substance by location, provided in the HMI group 11, by providing dynamic hazardous material inventory management and tracking. Materials that arrive at the receiving dock of a facility may be tracked from receipt through temporary storage, stock room, transfer from an issue or shipping location, distribution and final consumption at a process or use location. The HMM grouping 21 allows users to record the quantities of chemicals covered by MSDSs that are stored at centralized or at decentralized stock locations. Chemical shelf life is accounted for by use of shelf life condition codes, based on date of manufacture, expiration date and extendability.

Transfers of chemicals are tracked by amount transferred, container id. no. and destination. Use of transfer authorization logs allows users to document and review authorization of transfer of specific chemicals. The HMM grouping 21 is designed to facilitate communication with external receiving, stock control and shipping systems, using bar coding or other similar technology. Container movement can be tracked from one location to another, using bar code scanning.

The HMM grouping 21 monitors receipt of chemicals and chemical mixtures into inventory, maintenance of inventory records, and consumption of chemicals and chemical mixtures, using process definitions and using manual drawdown for non-process consumption. Process definitions cover all chemicals used as input materials for a given process. Process templates provide users with reusable process definitions and with process run parameters such as process run date and frequency of use. Chemical emissions, outfalls and by-product wastes am tracked as they arise by the HPM, HWM and EMF groupings 31, 51 and 71. The HMM grouping 21 can generate in-house chemical transfer and usage reports and mass balance reports and can help track progress on source reduction efforts.

The HPM functional grouping 31 complements the HMI and HMM groupings 11 and 21 by providing regulatory permit management from the regulated entity's perspective. The HPM grouping 31 manages both the permits and the activities covered by these permits, including ambient emissions (regulated under the CAA), effluent discharges (regulated under the CWA) and on-site waste storage and disposal (regulated under the RCRA). The HPM grouping 31 manages air, water and waste permits according to permit identification no., category, activation date, permit expiration date, renewal date, responsible party and other relevant parameters.

The HPM grouping 31 allows users to define and quantify all releases that issue from a "permitted process" (covered by one or more permits for that process) or other origin and to track results from source reduction efforts. In this grouping, release types and quantities are associated with permitted releases, based on limit values or allowances under the applicable permits, with permitted devices and permitted release points. The HPM grouping 31 enables users to define or specify the parameters of: all devices used in a process, such as boilers, degreasers and leaking equipment; all control technologies used, such as scrubbers, afterburners and liquid separators; and all release points, such as stacks, pipes, and aggregated fugitives, for permit compliance purposes.

Release monitoring, including measurement of release rates and quantities at the source(s), is also supported by the HPM grouping 31 and the EMF grouping 71. Sample data are collected and organized according to sample data type and amount, sampling station id. no., laboratory id. no., sample results, etc. The HPM grouping 31 also allows users to compare permitted release data with sample data to make release reduction decisions. Release reductions, actual and projected, are calculated based upon upstream source reduction, downstream abatement and/or unit shutdown. The HPM and EMF groupings 31 and 71 may also be used to track release allowances or credits based upon reduction of pollutants as required under federal and state economic incentive programs. The HPM grouping 31 and/or the EMF grouping 71 associates release reductions, classified by pollutant, with marketable allowances and credits, such as bankable emission credits, that may be auctioned, sold or traded. Waste accumulated in above-surface or below-surface units, such as underground storage tanks, or treated or disposed of on the site is also tracked according to permit requirements.

The HRM functional grouping 41 and the Emergency Management Function 71 manage all aspects of employee exposure to hazardous substances in the workplace, including implementation of workplace controls to improve worker health and/or safety and relevant employee medical information. Sharing common MSDS chemical and by-product waste data, these groupings create link with all substances that pose a health or safety risk, all employees at risk, and all injuries and illnesses resulting from exposures in the workplace. Each employee is associated, through an employee identification number, with exposure-related activities and events. The HRM grouping 41 allows users to define a process by identification numbers of employees participating in or affected by that process, by acute or chronic exposure of such employees, by medical examination and treatment of such employees, and by training of such employees. Employee transfer to and from specific activities can also be determined using this grouping.

Each process is also tracked by a process identification number, including type, location and duration of process. Each process can be cross-referenced against employee acute or chronic exposure events to support, refine or refute an employee's Worker's Compensation or legal claims. Injuries and illnesses resulting from exposure are recorded by the HRM grouping 41 to produce a Log and Summary of Occupational Injuries and Illnesses on O.S.H.A. Form 200, a Supplementary Record of Occupational Injuries and Illnesses on O.S.H.A. Form 101, and can support required state and local reports. Employee training and reinforcement, as required under the O.S.H.A. Hazard Communication Standard, is also managed by the HRM grouping 41, according to employee training requirements, individual training course descriptions, individual class descriptions, class meeting dates, class attendance, and other relevant items. Training information by attendee may be cross-referenced against injury and illness information to determine whether or not an affected employee had been given adequate training before exposure occurred. This training information includes lists of personnel trained for each of the first responder levels for an unscheduled or emergency release (emission or spill of a hazardous substance) and the update or refresher training received, or required to be received, by each such person. Performance of routine medical exams, accumulation of medical information, and other tracking or monitoring activities may be triggered by the cumulative exposure data on a given employee, or the employee may be reassigned to other duties.

The HWM functional grouping 51 expands upon the process definition structures of the HMM grouping 21 to manage and track all by-product wastes generated on-site.

Utilizing the waste recipes defined in the HMI grouping 11 and/or Waste Profiles, the HWM grouping 51 tracks all generated waste by waste stream, waste component and/or any other suitable waste attribute. Each waste that exits from a process is managed according to its ultimate disposition, whether that be reclamation, release into the environment, treatment, disposition as solid waste for on-site or off-site storage, or for contract haul. The HWM grouping 51 allows users to perform mass balance calculations to compare waste output with material input. Structures are incorporated to manage upstream and downstream waste minimization according to product change, input material change, process change and operation change. Waste minimization or source reduction results may be calculated in terms of actual or projected reductions.

Wastes to be transported are tracked from point(s) of generation to accumulation and collection point(s). The HWM grouping 51 enables users to track containers, including drums and stationary tanks, by location code (from compass point to locker or containment system number), and to monitor on-site waste accumulation within the RCRA ninety-day window. Containers packaged for transport may be cross-referenced by content with D.O.T. labeling and placarding information resident in the HMI grouping 11. Transactions relating to waste containers are included in the HWM information base.

Waste shipment to designated off-site treatment, storage and disposal facilities (TSDFs) is tracked using a Uniform Hazardous Waste Manifest and its information elements. Data on transporters and receiving facilities, including alternate facilities, are maintained in the HWM grouping 51 to generate a manifest for each contract haul. Historical manifests may be archived in the HWM grouping to establish a record of waste transactions from consignment to verification of destruction. User-defined reporting based on container sampling, cost of transportation and other manifest-related issues are also supported. Individual manifests may be tracked by generic manifest document number, state manifest document number, manifest certification date, container id. no., waste id. no., etc. The HWM grouping 51 can produce both the Facility Biennial Hazardous Waste report and the Generator Annual Report, as well as exception reports based on unreturned manifests.

The HCM functional grouping 61 is a highly flexible commitments manager that enhances the information management features of the other functional groupings. The HCM grouping manages and tracks actual and contemplated commitments according to commitment type, description, commitment id. no., start date and end date for a commitment, commitment deliverable, responsible party and commitment status. Each commitment is broken down into activities, and each activity is further broken down into phases. The HCM grouping 61 enables users to define commitments for any work flow, paper flow or information flow tracked by the invention. As an illustration, a user enhancing a safety inspection table in the HRM grouping 41, may utilize the HCM grouping 61 to build a safety inspection schedule for periodic (date specific) inspection of fire extinguishers, eye wash stations and decontamination systems for employee work stations.

The Emergency Management Function grouping 71, discussed above in connection with the HPM grouping 31 and other groupings, includes: statements of emergency response plans for different classes of emergency releases (emissions and spills) that are likely to be encountered in operation of a facility or site; locations, on site or elsewhere, of emergency equipment that may be needed to respond to an emergency release; identification of site personnel that have received emergency responder training and the particular response level(s) each such person is trained for; first response actions to be taken generally and for particular releases; problematical chemical or physical reactions that may occur if particular substances are released or combined, and actions that may be taken to suppress these reactions; emergency treatment for those exposed to particular chemicals in an emergency release; particular equipment that may be targeted by a particular released chemical; notification and evacuation procedures to be implemented in response to particular releases; mutual aid and coordinated response agreements and procedures for responses to unscheduled or excess releases at this site or a neighboring site; remedial, cleanup and decontamination procedures to be followed after a release; and notification requirements for regulatory agencies at the time of the release and subsequently.

The Facility Management Function grouping 81 provides regulatory permit management and emergency release/response monitoring from the regulator's perspective but may be used to assist or track compliance operations at a regulated facility as well. Information received and used in this grouping includes: identification of each regulated facility and the substances normally stored, used, made and/or treated there; identification of regulated facilities within each community; maps and floorplans for each regulated facility; permit applications and fees submitted, and application disposition, if any, for each regulated facility; compliance history and agency inspections for each regulated facility; complaints, verbal notifications, citations, violation notices and fines assessed for each regulated facility, and the facility's response to these; and court actions concerned with compliance and/or regulatory interpretation for a facility.

A plurality K of these functional groupings (K=3–8) are integrated by a relational database schema or 91 in particular embodiments. From the database schema 91, common data are created, updated, stored and retrieved within and between functional groupings. Preferably built upon ORACLE Corporation's Relational Data Base Management System, the database schema 91 effectively links and fuses the invention's functional groupings, and thus eliminates data entry redundancy. However, other database management systems, offered by companies such as INFORMIX and SYBASE, may also be used here. The HMI functional grouping 11 provides the database schema 91 with the invention's core (critical) data sets. These data sets include the Chemical Profile, MSDS definition and waste definition structures of the HMI grouping 11. The relational database 91 utilizes the Chemical Profile, MSDS definition, waste definition and substance release response data sets to supply common data to functions throughout the system. The waste definition set is based upon the MSDS definition set and the Chemical Profile set. The MSDS definition set, in turn, relies upon the Chemical Profile set to profile MSDS product ingredients.

The following examples, illustrated schematically in FIG. 2, indicate the scope of sharing or exchange of information between the functional groupings that are part of the system. The HPM and HRM groupings 31 and 41 may, but do not normally, share information with each other. The FMF grouping 81, maintained by a regulatory agency, can receive and share compliance information with each of the other groupings 11, 21, 31, 41, 51, 61 and/or 71. All other pairs of groupings, such as the HMI and HWM groupings 11 and 51, can and normally do share or exchange information relevant to regulatory compliance.

The HMI grouping maintains data allowing conversion from one unit of measure to another, and these conversion data are accessed and used by the HPM, HWM, EMF and FMF groupings 31, 51, 71 and 81 in determining actual emission levels and permitted levels. Where permitted thresholds are exceeded, the required regulatory agency reports are prepared by the HMI grouping 11 and/or the EMF grouping 71.

The HMI grouping 11 maintains chemical exposure limits, based upon the Chemical Profile and MSDS data. These data are shared with the HRM, EMF and FMF groupings 41, 71 and 81 in determining when an employee has exceeded, or is likely to exceed, that employee's exposure limit for one or more of the monitored chemicals.

The HMI grouping 11 can generate the regulatory agency reports required for compliance, and the HCM and FMF groupings 61 and 81 track preparation and completion of such reports as commitments. For example, when a final version of a Tier Two Report is prepared and submitted, the HCM grouping would receive and store the date of completion and submission of this Report.

The HMI grouping 11 or the HWM grouping 51 maintains Waste Profile data, including physical property information on the wastes generated at the facility. These data are accessed by the HWM and FMF groupings 51 and 81 to determine whether a given waste is subject to RCRA compliance requirements.

Discharge of waste into the environment may be allowed only under a permit. If such discharge is covered by a permit, the HMI groupings 11 will share information obtained from monitoring of the permitted discharge operation with the HPM, HRM, HWM, EMF and FMF groupings 31, 41, 51, 71 and 81.

Recycled waste, recorded under the HWM grouping 51, is also entered as received inventory under the HMM grouping 21.

Operation under a permit is allowed for a specified time interval. When a permit is granted to a facility, the HPM grouping 31 shares this information with the HCM and FMF groupings 61 and 81, and the HCM grouping advises the user of the permit expiration date before this date. At that time, re-application for the expiring permit becomes a commitment, generated by the HCM grouping 61.

Information on wastes discharged is recorded by the HWM grouping 51 and shared with the HPM and FMF groupings 31 and 81, to determine the total amount discharged in a given time interval and to check for permit compliance. As the permit limit on discharge is approached, special limitations on such discharge may be adopted, and waste generation may also need to be curtailed. The HMM grouping 21 may be consulted to determine candidates for process curtailment or shutdown.

The HWM and EMF groupings 51 and 71 transfer exposure data on each employee to the HRM grouping 41.

The HRM grouping 41 defines certain required events for each employee, such as periodic medical exams and training courses, and the HCM and FMF groupings 61 and 81 can track or monitor completion of these required events.

If a given waste is subject to the 90-day limit on accumulation under RCRA, the HCM grouping 61 creates a commitment to transport the waste to a TSDF. A Uniform Hazardous Waste Manifest is created, and the transfer to the TSDF is logged by the HWM and FMF groupings 51 and 81. The HWM and HCM groupings 51 and 61 also cooperate to provide a reconciliation of outstanding Certificates of Destruction, not yet received from the TSDF for a given waste shipment.

The EMF grouping 71 shares response, notification and cleanup information on actual emergency releases with the HRM and FMF groupings 41 and 81.

The following information is included in the Chemical Profile, MSDS definition and waste definition data and accessed by the relational database schema 91 as needed. The chemical locator, MSDS-by-location and waste-by-location subsets are also included for substance tracking.

Function Name: CHEMICAL PROFILE
  Fields Maintained by this Function
    Group 1: Chemical Identification
CHEMICAL ID. NO.
CHEMICAL ABSTRACT SERVICES (C.A.S.) NO.
CHEMICAL NAME
UN/NA ID. NO.
RCRA WASTE NO.
FORMULA
CHEMICAL FAMILY
GENERIC NAME
REMARKS
    Group 2: Synonyms
SYNONYMS
    Group 3: Physical Properties
BOILING POINT
MELTING POINT
VAPOR DENSITY
WATER SOLUBILITY
PERCENT VOLATILE BY WEIGHT
EVAPORATION RATE
SPECIFIC GRAVITY
VAPOR PRESSURE
STATE: SOLID, LIQUID OR GAS
APPEARANCE
ODOR
FLASH POINT
OXYGEN LOWER LIMIT FOR FLAMMABILITY
OXYGEN UPPER LIMIT FOR FLAMMABILITY
FLAMMABILITY COMMENTS
EXTINGUISHING MEDIA
FIRE FIGHTING PROCEDURES
FIRE AND EXPLOSION HAZARD
    Group 4: Reactivity
CHEMICAL STABILITY CONDITIONS TO AVOID
HAZARDOUS POLYMERIZATION CONDITIONS TO AVOID
INCOMPATABILITY
DECOMPOSITION PRODUCTS
REACTIVITY REMARKS
    Group 5: Reactivity Group
REACTIVITY GROUP NO.
DESCRIPTION
    Group 6: Hazard Category
E.P.A. FIRE
E.P.A. PRESSURE
E.P.A. REACTIVE
E.P.A. ACUTE
E.P.A. CHRONIC
O.S.H.A. FLAMMABLE
O.S.H.A. COMBUSTIBLE LIQUID
O.S.H.A. PYROPHORIC
O.S.H.A. OXIDIZER
O.S.H.A. EXPLOSIVE
O.S.H.A. COMBUSTIBLE GAS
O.S.H.A. UNSTABLE
O.S.H.A. ORGANIC PEROXIDE
O.S.H.A. WATER REACTANT
O.S.H.A. HIGHLY TOXIC O.S.H.A. TOXIC
O.S.H.A. IRRITANT
O.S.H.A. SENSITIZER
O.S.H.A. CORROSIVE
O.S.H.A. CARCINOGEN
O.S.H.A. TARGET ORGAN EFFECT: HEPATOTOXIN
O.S.H.A. TARGET ORGAN EFFECT: NEPHROTOXIN
O.S.H.A. TARGET ORGAN EFFECT: NEUROTOXIN
O.S.H.A. TARGET ORGAN EFFECT: HEMATOTOXIN
O.S.H.A. TARGET ORGAN EFFECT: PULMONOTOXIN
O.S.H.A. TARGET ORGAN EFFECT: REPRODUCTIVE SYSTEM
O.S.H.A. TARGET ORGAN EFFECT: MUTAGEN
O.S.H.A. TARGET ORGAN EFFECT: TERATOGEN
O.S.H.A. TARGET ORGAN EFFECT: CUTANEOUS
O.S.H.A. TARGET ORGAN EFFECT: EYE
NATIONAL FIRE PROTECTION ASSOCIATION (N.F.P.A.) HEALTH CODE
N.F.P.A. FLAMMABILITY CODE
N.F.P.A. REACTIVITY CODE
N.F.P.A. SPECIAL HAZARDS
  Group 7: Exposure Limits
AMERICAN CONFERENCE OF GOVERNMENTAL AND INDUSTRIAL HYGIENISTS (A.C.G.I.H.) THRESOLD LIMIT VALUE (TLV)-TIME WEIGHTED AVERAGE (TWA)
OTHER TLV-TWA
A.C.G.I.H. TLV-SHORT TERM EXPOSURE LIMIT (STEL)
OTHER TLV-STEL
A.C.G.I.H. CEILING
OTHER CEILING
A.C.G.I.H. SKIN
OTHER SKIN
O.S.H.A. PERMISSIBLE EXPOSURE LIMIT (PEL)-TWA
OTHER PEL-TWA
O.S.H.A. PEL-STEL
OTHER PEL-STEL
O.S.H.A. CEILING
O.S.H.A. SKIN
  Group 8: Health Hazards
ROUTES OF ENTRY INHALATION/REMARKS
ROUTES OF ENTRY SKIN CONTACT/REMARKS
ROUTES OF ENTRY INGESTION/REMARKS
ROUTES OF ENTRY EYE CONTACT/REMARKS
ACUTE EFFECTS
CHRONIC EFFECTS
I.A.R.C. CANCER AGENT/REMARKS
N.T.P. CANCER AGENT/REMARKS
O.S.H.A. CANCER AGENT/REMARKS
EXPOSURE SIGNS AND SYMPTOMS
MEDICAL CONDITIONS AGGRAVATED BY EXPOSURE
  Group 9: Safety Measures
RESPIRATORY PROTECTION REQUIRED
VENTILATION REQUIRED
PROTECTIVE GLOVES REQUIRED
EYE PROTECTION REQUIRED
OTHER PROTECTIVE EQUIPMENT REQUIRED
WORK/HYGIENIC PRACTICES
  Group 10: Emergency Care
EMERGENCY CARE PROTOCOL ID. NO.
EMERGENCY CARE PROTOCOL
  Group 11: Storage and Special Precautions
STORAGE CONDITIONS
HANDLING/STORAGE PRECAUTIONS
OTHER PRECAUTIONS
PERSONNEL SAMPLING PROCEDURE
  Group 12: Spills or Leaks
SPILL OR LEAK PROCEDURES
WASTE DISPOSAL METHOD
EMPTY CONTAINERS
  Group 13: Emergency Response
EMERGENCY RESPONSE PROTOCOL ID. NO.
  Group 14: Transportation
PROPER SHIPPING NAME
HAZARD CLASS
LABELS REQUIRED
SPECIAL PROVISIONS REQUIRED
EXCEPTIONS, IF ANY
PACKAGE GROUP
BULK
NON-BULK
AIR OR RAIL
CARGO AIR ONLY
VESSEL STOWAGE
OTHER STOWAGE
  Group 15: SARA Title III Lists
SARA SECTION 302 T.P.Q. LOWER
SARA SECTION 302 T.P.Q. UPPER
SARA SECTION 302 R.Q.
SARA SECTION 313 LISTED
CERCLA R.Q.
IS REPORT REQUIRED?
  Group 16: Other Regulatory Lists
REGULATORY LIST ID. NO.
REGULATORY LIST LOWER T.P.Q.
REGULATORY LIST UPPER T.P.Q.
REGULATORY LIST R.Q.
REGULATORY LIST OTHER QUANTITY
REGULATORY LIST UNIT OF MEASURE
REGULATORY LIST ACTION REQUIRED
REGULATORY LIST REMARKS
Function Name: CHEMICAL LOCATOR
  Fields Maintained by this Function
C.A.S. NO.
GENERIC NAME
SYNONYM LOOKUP
CHEMICAL ID. NO.
UN/NA ID. NO.
SYNONYMS
Function Name: MSDS DEFINITION
  Fields Maintained by this Function
  Group 1: Material Identification
MSDS ID. NO.
C.A.S. No.
REFERENCE NO.
TRADE NAME(S)
COMMON NAME(S)
MANUFACTURER
PRODUCT CODE
DATE PREPARED
COMPONENT NAME(S)
PURE CHEMICAL?
MIXTURE?
STATE: SOLID/LIQUID/GAS
PROTECTED AS TRADE SECRET?
POWDER PARTICLE SIZE
SOLID METAL PARTICLE SIZE
REMARKS
  Group 2: Synonyms
MSDS SYNONYM(S)
  Group 3: Ingredients
INGREDIENT C.A.S. NO.

INGREDIENT NAME(S)
INGREDIENT PERCENT BY WEIGHT
Function Name: MSDS BY LOCATION
   Fields maintained by this Function
   Group 1: Location
MSDS ID. NO.
LOCATION
CONFIDENTIAL LOCATION?
MAXIMUM AMOUNT
AVERAGE DAILY AMOUNT
DAYS ON-SITE
UNIT OF MEASURE
REMARKS
   Group 2: Consumption Information
CONTAINER ID. NO.
ARRIVAL DATE
REMOVAL DATE
ORIGINAL QUANTITY
CURRENT QUANTITY
UNIT OF MEASURE
STORAGE TYPE
STORAGE TEMPERATURE
STORAGE PRESSURE
REMARKS
Function Name: WASTE DEFINITION
   Fields Maintained by this Function
WASTE ID. NO.
WASTE TYPE
NAME(S)
C.A.S. NO.
D.O.T. ID. NO.
STATE WASTE CODE/REMARKS
WASTE INGREDIENT(S)/REMARKS
PERCENT BY UNIT
Function Name: WASTE BY LOCATION
   Fields Maintained by this Function
   Group 1: Waste and Location Identification
WASTE ID. NO.
LOCATION ID NO.
UNIT OF MEASURE
MAXIMUM AMOUNT
AVERAGE DAILY AMOUNT
LONGEST TIME INTERVAL ON SITE
REMARKS
   Group 2: Waste Container Tracking
CONTAINER ID. NO.
ARRIVAL DATE
REMOVAL DATE
ORIGINAL QUANTITY
CURRENT QUANTITY
UNIT OF MEASURE
STORAGE TEMPERATURE AND TYPE
STORAGE PRESSURE
REMARKS
Function Name: PERMITS
   Fields Maintained by this Function
   Group 1: Permit Identification
PERMIT ID. NO.
PERMIT TYPE
CATEGORY
EFFECTIVE DATE
EXPIRATION DATE
RENEWAL DATE
RESPONSIBLE PERSON
PERMIT COST
   Group 2: Permitted Emissions
WASTE ID. NO.
WASTE QUANTIFY
   Group 3: Permitted Devices
DEVICE ID. NO.
DEVICE DESCRIPTION
   Group 4: Permitted Emissions
EMISSION POINT ID.
DESCRIPTION OF EMISSION POINT
EMISSION ID. AND CAS NO.
TIME INTERVAL FOR EMISSIONS, MINIMUM AND MAXIMUM AND AVERAGE AMOUNTS EMITTED, LIMITS EXCEEDED
   Group 5: Permitted Processes
PROCESS ID. NO.
DESCRIPTION OF PROCESS
   Group 6: Regulatory Agency Requirements
AGENCY NAME, ADDRESS, ID. AND GENERAL DESCRIPTION OF REPORTING/PERMIT/LICENSE REQUIREMENTS
CATEGORY(IES), REQUIREMENT TYPE(S) AND DETAILED DESCRIPTION(S) FOR EACH REPORT, PERMIT, AND LICENSE
Function Name: COMMITMENTS
   Fields Maintained by the Function
   Group 1: Commitment Identification
COMMITMENT DESCRIPTION
COMMITMENT ID. NO.
SCHEDULED START DATE
SCHEDULED END DATE
DELIVERABLE UNDER COMMITMENT
COMMITMENT TYPE
RESPONSIBLE PERSON
ACTUAL START DATE
ACTUAL END DATE
CURRENT STATUS
   Group 2: Commitment Phase
PHASE DESCRIPTION
PHASE NO.
SCHEDULED START DATE
SCHEDULED END DATE
DELIVERABLE UNDER PHASE
RESPONSIBLE PERSON
ACTUAL START DATE
ACTUAL END DATE
CURRENT STATUS
   Group 3: Activity
ACTIVITY DESCRIPTION
ACTIVITY ID. NO.
SCHEDULED START DATE
SCHEDULED END DATE
DELIVERABLE UNDER ACTIVITY
REPSPONSIBLE PERSON
ACTUAL START DATE
ACTUAL END DATE
CURRENT STATUS
Function Name: EMERGENCY RELEASES
   Fields Maintained by the Function
   Group 1: Facility Emissions and Spills
AREA TYPE AND ID.
FACILITY ID.
PERMIT TYPE, IF ANY, ID. AND TIME INTERVAL COVERED
ID., CAS NO.
DESCRIPTION OF SUBSTANCE RELEASED, AND TIME INTERVAL DURING WHICH RELEASE OCCURRED
LIMITS EXCEEDED, IF ANY, DURING RELEASE
   Group 2: Area Emissions and Spills AREA TYPE AND ID.
FACILITY ID.
PERMIT TYPE, IF ANY, ID. AND TIME INTERVAL COVERED
ID., CAS NO. DESCRIPTION OF SUBSTANCE RELEASED, AND TIME INTERVAL DURING WHICH RELEASE OCCURRED
LIMITS EXCEEDED, IF ANY, DURING RELEASE
GOALS, IF ANY, FOR AREA RELEASES
    Group 3: Emergency Response Action(s)
EMERGENCY ID. NO.
EMERGENCY STATUS
REPONSE ACTION(S) TAKEN
TIME INTERVAL(S) COVERED BY ACTION(S)
COGNIZANT AGENCY(IES)
    Group 4: Emergency Response Protocols
RESPONDER ACTIONS
PROTOCOL CODES AND DESCRIPTIONS
    Group 5: Emergency Response Staffing
EMPLOYEE ID, NAME, SSN, DAYS CODE, SHIFT CODE
EMPLOYEE TRAINING (RESPONDER LEVELS)
    Group 6: Emergency Response Equipment
EQUIPMENT ID, TYPE, LOCATION, DESCRIPTION, MANUFACTURER, STATUS CODE
    Group 7: Emergency Notification
EMERGENCY ID NO, TYPE
EMERGENCY DATE AND DESCRIPTION
AGENCY(IES) NOTIFIED, NOTIFICATION DATES AND TIMES, IDENTITIES OF NOTIFIER AND NOTIFIED PERSON(S)
HAZARDOUS SUBSTANCE INVOLVED, QUANTITY, LOCATION
Function Name: REGULATORY OVERSIGHT INFORMATION
    Fields Maintained by the Function
    Group 1: Facilities
FACILITY NAMES, ID NOS. AND ADDRESSES, BY AREA
    Group 2: Permits Obtained by Each Facility
FACILITY NAME, ID. NO. AND ADDRESS
PERMIT TYPE AND ID NO.
DESCRIPTION OF PERMITTED ACTIVITY(IES)
PERMIT STATUS CODE
PERMIT FEE TYPE, AMOUNT PAID AND DATE OF PAYMENT(S)
FEE ASSESSMENT INTERVAL
    Group 3: Permit Applications by Each Facility
FACILITY NAME, ID. NO. AND ADDRESS
PERMIT APPLICATION ID. NO. AND DESCRIPTION
PERMIT APPLICATION STATUS CODE
FACILITY INVOICED AMOUNTS, DATE(S) OF ASSESSMENT, AND AMOUNTS AND DATE(S) OF PAYMENT(S)
    Group 4: Compliance History for Each Facility
FACILITY NAME, ID. NO. AND ADDRESS
COMPLIANCE ACTION ID., DESCRIPTION, SCHEDULED DATE, ACTUAL DATE OF COMPLETION, RESOLUTION DATE AND STATUS CODE The above data blocks and fields illustrate use of the relational database schema 91. The invention utilizes these data to manage and track hazardous substance-related information across all flows of paper, work product, chemicals and complex data, for environmental, health and safety monitoring. Computer screen displays representing the Chemical Profile Function are illustrated in FIGS. 5–22; computer screen displays representing the MSDS Definition Function are illustrated in FIGS. 23–25; a computer screen display representing the Waste Definition Function is illustrated in FIG. 26; computer screen displays representing the Waste By Location Function are illustrated in FIGS. 27–28 and 37; computer screen displays representing the Permits Function are illustrated in FIGS. 29–33; and computer screen displays representing the Commitments Function are illustrated in FIGS. 34–36. Computer displays representing the Emergency Release Function and the Facility Management Function are represented in FIGS. 38–48 and 49–55, respectively. The information contained in the computer screen displays for the Chemical Locator and MSDS By Locations Functions is similar to that contained in other computer screen displays.

In Group 7 of the Chemical Profile Function, provision is made for entry of the Threshold Limit Value ("TLV"), if any, proposed by the A.C.G.I.H., the Permissible Exposure Limit ("PEL"), if any, proposed by the O.S.H.A., and any other maximum exposure limit adopted by the user for a given chemical that is subject to hazardous substance monitoring. In Group 1 of the MSDS By Location Function, the fact that a particular location at a facility is confidential and off-limits to most non-employees may be noted.

Each of the computer screens for a given Function, such as Chemical Profile, is optionally provided with a small block, appearing in the upper left corner or elsewhere on the screen, and containing one of three marks or indicia: > or < or <>. For a Function that has N associated computer screens ($N \geq 2$), these indicia indicate whether the presently displayed screen is the first screen ($n=1$), the last screen ($n=N$) or one of the intermediate screens ($2 \leq n \leq N-1$), respectively, among that group of N screens. Optionally, if a particular information Group within a Function requires $M \geq 2$ computer screen for display, a second block can be provided on each of these screens for that Group indicating that the presently displayed screen is screen number m of M screens ($1 \leq m \leq M$). These include the Chemical Profile: Physical Properties displays illustrated in FIGS. 7 and 8, and the Chemical Profile: Health Hazards displays illustrated in FIGS. 13 and 14.

An illustration of the magnitude of the information management challenge facing a regulated entity is provided in FIGS. 3 and 4, which illustrate operations of a manufacturing company, XYZ Manufacturing, Inc. ("XYZ") that maintains two plants, Plant "A" and Plant "B". Plant A (FIG. 3), located in Wheeling, W. Va., manufactures specialty steel that is used for high strength architectural applications. Plant B (FIG. 4), located in Southern California, manufactures wing and horizontal stabilizer subassemblies for the F15 Eagle fighter plane. Plant B includes one building in the City of Glendale and a second building in the County of Los Angeles. Both buildings of Plant B are in the jurisdiction of the South Coast Air Quality Management District. The following regulatory agencies have jurisdiction over operations at Plant A and/or Plant B.

Federal
        Environmental Protection Agency ("E.P.A."); and
        Occupational Safety and Health Administration ("O.S.H.A.").
    State
        California Environmental Protection Agency ("Cal E.P.A.");
        California Occupational Safety and Health Administration ("Cal O.S.H.A.");
        California Office of Environmental Services ("O.E.S."); and West Virginia defers to the federal regulations and does not have a separate regulatory structure.

Local

City of Glendale, Calif. Fire Department;

City of Wheeling, W. Va. Fire Department;

County of Los Angeles, Calif. Fire Department;

South Coast Air Quality Management District ("S.C.A.Q.M.D."); and

South Coast Water Quality Management District ("S.C.W.Q.M.D.").

XYZ is required to meet reporting requirements for at least ten separate regulatory agencies. Requirements promulgated at the state and local level can supersede or supplement those promulgated by the federal government. Reports from XYZ that are required by each agency along with the supporting documentation impose a non-trivial cost to XYZ to manage and respond to. The system provided by the invention (the "System") provides a cost-effective solution for companies such as XYZ that must manage their environmental, health and safety "EH&S") information.

XYZ must manage its EH&S information with the requirements of multiple regulatory jurisdictions in mind. Different regulatory jurisdictions may even have conflicting regulatory requirements. The requirements imposed by the different regulatory agencies on XYZ include the following.

1. Federal E.P.A. receives XYZ's annual filing of its process discharge reports, such as Toxic Release Inventory, or Form R report. Form R report also includes summary data on how XYZ complies with the Pollution Prevention Act of 1990. In its manufacturing operations, XYZ utilizes 100 separate chemicals that are subject to Form R filing requirements.

2. Federal O.S.H.A. enforces the Worker Right-to-Know or Workplace-Related Injury and Health Reporting and Recordkeeping and Emergency Action Plan Development and Recordkeeping.

3. Cal E.P.A. implements California-specific regulations relating to process discharges of specified hazardous materials. Here, regulations of a state agency supersede federal requirements. The primary report that to be submitted to Cal E.P.A. to comply with its reporting requirements is the California Assembly Bill 2588 report.

4. Cal O.S.H.A. implements specific California Occupational Safety and Health regulations.

5. Cal O.E.S. is responsible for supporting hazardous materials-related emergency response actions. A written Accidental Release Follow-Up Notification is to be submitted to this agency to comply with the requirements of SARA Title III, Section 304.

6. Glendale Fire Department is responsible for maintenance of annual chemical inventory reports submitted by the XYZ site located in the City of Glendale. Glendale Fire Department requires submission of the annual chemical inventory reports on its own format.

7. Wheeling Fire Department is responsible for maintenance of annual chemical inventory reports submitted by the XYZ site located in the City of Wheeling. Wheeling Fire Department requires submission of annual chemical inventory reports on its own format.

8. Los Angeles County Fire Department is responsible for maintenance of annual chemical inventory reports submitted by the XYZ site located in the County of Los Angeles. Los Angeles County Fire Department requires submission of the annual chemical inventory reports on its own format.

9. S.C.A.Q.M.D. is responsible for monitoring the quality of the air resource within the boundaries of its jurisdiction. S.C.A.Q.M.D. can promulgate and enforce regulations aimed at reducing the emission of air pollutants within its jurisdiction.

10. S.C.W.Q.M.D. is responsible for the monitoring and improvement of water resource quality within the boundaries of its jurisdiction. S.C.W.Q.M.D. can promulgate and enforce regulations aimed at reducing the emission of water pollutants within its jurisdiction.

XYZ is thus faced with a plethora of EH&S-related regulatory reporting requirements. Each EH&S regulatory reporting requirement carries substantial civil and/or criminal penalties for non-compliance. The following example illustrates the magnitude of the information that XYZ must manage to meet its EH&S-related regulatory reporting requirements. Plant B (Glendale and Los Angeles County, Calif.) Operation Building 10 has 2,500 separate hazardous substances in use that are subject to EH&S reporting requirements. These 2,500 chemicals are in use in the manufacturing operation and have been defined to be hazardous by either a federal, state, or local law or ordinance. A Material Safety Data Sheet has an information update cycle, requiring revision and updating of information, of approximately once every six months. Revised MSDSs are sent by chemical manufacturers to the XYZ Safety Manager daily.

Building 20 has 3,000 separate hazardous substances in use that are subject to regulatory agency reporting requirements. An MSDS is updated approximately once every six months, and MSDS revisions are received by the XYZ Safety Manager daily.

Plant A (Wheeling, W. Va.) Operation

Building 1 has 3,000 separate hazardous substances in use that are subject to regulatory agency reporting requirements. An MSDS is updated approximately once every six months, and MSDS revisions are received by the XYZ Safety Manager daily.

Building 2 has 3,000 separate hazardous substances in use that are subject to regulatory agency reporting requirements. An MSDS is updated approximately once every six months, and MSDS revisions are received by the XYZ Safety Manager daily.

The following examples illustrate the EH&S information management requirements faced by XYZ. These requirements occur on a daily basis.

1. An XYZ employee requests a copy of the MSDS for Blue Solvent that the employee works with. Under federal and state O.S.H.A. Hazards Communication Standards, employees must have access to MSDSs for all hazardous substances with which they work. The only product identification the employee has for the chemical is what the chemical is called on the Shop Floor: Blue Solvent.

2. Submission of Chemical Inventory Reports to the local emergency response report agency is due in ten business days. A separate report must be prepared for each agency jurisdiction in the form and format required by the agency. Chemicals that must be reported are those identified as subject to reporting requirements by each agency. Chemicals subject to the reporting requirements am in use throughout the facility. An accurate inventory of the chemicals in each location, as well as chemical storage type, storage temperature, maximum amount, average daily amount, and the number of days on site, must be reported.

3. Submission of the Emergency Response Plan (as required under SARA Title III, Sections 301–303) is due in 30 business days. Chemicals subject to Emergency Response Planning requirements vary by local agency. The Wheeling, W. Va. L.E.P.C. accepts the Federal list of Extremely Hazardous Substances ("EHS") as defined in SARA Title III, Section 302. The Glendale, Calif. L.E.P.C. has defined a separate list of Emergency Response Planning Substances to include the SARA Title III, Section 302 listed substances, as well as the California Proposition 65 listed substances. The Los Angeles County L.E.P.C. has defined a further separate list of Emergency Response Planning Substances to include the SARA Title III, Section 302 listed substances, the listed substances under California Proposition 65, and under A.B. 2588.

4. Underground Storage Tanks UST located on the Building 10 site are scheduled to be inspected for leaks in 15 calendar days by the City of Glendale Fire Department.

5. Corporate Counsel for XYZ notifies the Safety Manager that XYZ has been served with a lawsuit by Jane Doe, one of its employees. The lawsuit alleges that two years earlier, when Jane Doe began working in the Wing Subassembly area of Plant B, Building 10, she was exposed to trichloroethylene ("TCE"), a solvent used to prepare the finished wings for painting before shipment. Jane Doe further alleges that the exposure continued for the duration of her employment. She recently went on maternity leave. She alleges that she was never advised of the exposure or of the health consequences of that exposure. One month ago, Jane Doe gave birth to a child with a severe case of Down's Syndrome. TCE has been determined by the State of California to be a teratogen. Jane Doe alleges that, as a result of such exposure, she gave birth to a child with Down's Syndrome. Jane Doe requests medical damages on the order of $1 million, to provide for the future medical expenses of caring for the child, and punitive and exemplary damages of $2 million.

6. At 11:00 a.m. EST, an accident occurs at Plant A. A forklift operator was attempting to pick up a load of reinforcing bars from the finishing area and move it to the preshipment area. The forklift that is normally used for this operation was not operating. As a substitute, a backhoe was used. While moving the reinforcing bars, the hoe part of the backhoe struck a pipe that led to a tank that contains finishing etching compound. As a consequence of the accident, the entire contents of the tank (2,000 gallons) was released. Ten people were immediately hospitalized with second degree skin burns. The etching compound eventually drained out of the boundary of Plant A and went into the storm drain that feeds into the publicly-owned treatment works for the City of Wheeling, W. Va. The Safety Manager for XYZ received a call from the Plant Manager for Plant A at 11:15 a.m. EST. The Safety Manager was detained in commute traffic on the Harbor Freeway on the way to work at XYZ's corporate offices in Glendale, Calif., and arrived at work at 8:30 a.m.

The following actions are necessary to meet the information management requirements in one day's operation of XYZ.

Manual System EH&S Management—No Automation of Information

1. Process MSDS Request in a timely manner. As a first step, the Safety Manager or his designee cross references Blue Solvent to the particular chemical. This may be difficult to find. As an initial step, a list of chemical name synonyms would have to be created and updated as necessary. Each time a chemical is added to the inventory of chemicals used in the facility, the chemical's synonym(s) would be entered in the synonym list. A chemical may have as many as five or more synonyms.

Once the product in question has been identified, the file copy of the MSDS would be located, a copy made, and the copy provided to the requesting employee. This assumes that the most recent copy of the MSDS is filed as the master file copy. If the company has violated the O.S.H.A. Employee Right-to-Know regulations, set forth in C.F.R. 29, 1910.1200 as amended, civil and criminal penalties are provided for violations.

As a further step in the process, a record of the MSDS request would be created and a copy of the record of request would be placed in the employee's personnel file. The process of creating a record of request and placing it in the employee's personnel file involves staff time to prepare the record of request, management time to review the record of request, and staff time to file the record of request.

2. Completion of the regulatory agency reports in multiple formats for 2,500 or more chemicals is a non-trivial task, requiring approximately 800 staff hours at one such facility per report. If four such separate reports are required, the staff time requirement increases to 3,200 hours. If the collection of the data required for the reports has not yet occurred, the reports cannot be prepared, reviewed, revised, re-reviewed, and ultimately submitted in time to meet the deadline ten business days away. Penalties for delays in filing the required reports range from $2,500 to $75,000 per violation per day that the report is late. Each chemical that is not reported on time constitutes a separate violation.

3. The chemicals on site that are subject to the Emergency Response Planning requirements must be determined, for use in the EMF grouping 71 and elsewhere. Because the different administering agencies have each specified a different set of chemicals that are subject to emergency response planning requirements, a further complication is introduced. After identification of the chemicals subject to such planning, the Emergency Response Plan must be developed. An existing plan must be updated periodically. Elements to be included in the Emergency Response plan include evacuation routes, analysis of geographic areas that would be affected by the substance if released, and any steps that are to be taken to mitigate adverse impacts on the environment as a consequence of release of the substance.

An Emergency Response Plan is a living document, to be used if an emergency occurs. Therefore, emergency response personnel must have access to the Plan. As with chemical inventory reports, delay in preparing and submitting the required Emergency Response Plan carries substantial sanctions.

4. If any of the underground storage tanks is found to be leaking, tank removal and soil remediation will have to be done, an expensive undertaking. Testing prior to the formal inspection test can alert the company to the upcoming removal/remediation expense. If a leak is caught immediately after it develops, the remediation expense can be limited. Action items can be set up so that underground storage tanks are inspected on a monthly schedule. As tanks age, the frequency of periodic inspections should increase. Annual inspections are performed until the tank reaches an age of five years. Thereafter, inspections should be performed quarterly until the tank reaches an age of ten years. Without automation, the time for managing the inspection process is increased. If more creativity is applied (e.g., increasing the frequency of inspections as the tank ages), less time management is required.

5. Litigation defense is a time-consuming activity. The record of chemicals that Jane Doe was working with during her employment at the XYZ Plant A site must be established. If hazardous chemicals (in this case, those with teratogenic hazards) are in use in Jane Doe's workplace, specific warnings must be provided concerning the teratogenic nature of the substance in use. The records of hazardous materials use must be cross referenced with the MSDS for each material. The MSDS for each chemical must be verified as to the currency of the information as of the time the MSDS was distributed. That is, the most current version of the MSDS that existed at the time Jane Doe was working with TCE may not have identified the material as teratogenic. Alternatively, the then-most-current MSDS may have identified the material as teratogenic, but because of misfiling, a prior MSDS was distributed that did not identify the material as being teratogenic.

All data collection activities performed in defending XYZ from the litigation claim are expensive, because they involve these consume much staff time, which is typically highly skilled. Highly skilled staff time typically costs in excess of $20.00 per hour. If Jane Doe's claim is successful, the judgment itself is an additional expense.

6. Timely response to an accidental release is critical to XYZ's avoidance of liability for civil and criminal penalties and to compliance with the requirements of the EMF and/or the FMF groupings 71 and 81. A specific set of response deadlines is set forth for notification of an accidental release. Failure to meet the deadlines results in the application of fines. If the failure to meet the deadlines is determined to be willful, criminal sanctions can be applied. A responsible individual at XYZ is designated for contacting the appropriate local Emergency Response representative to give verbal notification of the spill. As part of the verbal notification, definition of the substance spilled, magnitude of the spill, emergency response actions being taken, etc., must be provided. As soon as practicable (and Emergency Response agencies vary in their definition of "practicable"), the facility representative must follow up the verbal report with a written report on the Accidental Release.

The Safety Manager at XYZ will be responsible for responding to all these events concerning operation of XYZ. Each reportable event has very high priority and requires a high degree of accuracy. Inaccurate information has a very negative value. Because of the quantities of hazardous materials in use at the facility, the focus is on compliance with XYZ's reporting requirements. The cost of labor to support the Environmental Health & Safety information management requirements of XYZ is generally in excess of $20.00 per hour. Further, there is a high financial penalty for failure to meet the Environmental Health & Safety information management requirements of XYZ. These are all reasons for the application of information management technology to the management of the Environmental Health & Safety information of XYZ.

Use of the System's Automated EH&S Information Management Technology

1. Process MSDS Request. The MSDS Inquiry Screen is used to request a copy of any MSDS that is loaded in a system incorporating the invention. MSDS records can be retrieved by the following criteria:

Chemical Name;

Trade Name;

Chemical Abstract Service Number;

Chemical Profile Number;

Manufacturer;

Synonym;

Component Name.

Once the retrieval criteria are entered, the invention will retrieve the record(s) matching the retrieval criteria. When a particular record is selected, any of the following actions can be taken:

Display the image of the particular MSDS;

Print the image of the particular MSDS;

Fax the image of the particular MSDS to a destination facsimile machine;

If authorized, the user can print the Chemical Profile appended to the MSDS.

Whenever the user requests any of the above actions (display, print, fax transmission, etc.), the invention will automatically record the following information about the transaction:

User log-on id. no.;

Record that was accessed and date and time of such access

This information is useful in tracking historical information about the information that was disseminated to the user. Collection of the information is automatic, and does not interfere with the use of the System. In the foregoing example of Blue Solvent, the user would enter the "Blue Solvent" in the Synonym field of the MSDS display. Pressing the EXECUTE QUERY or other designated key would yield a list of records that matched the Synonym entry of "Blue Solvent". Assuming that only one entry of Blue Solvent is present, that record would be retrieved, and the user log-on id. no. and date and time of record access would again be recorded. The user could then request any of the above-mentioned actions.

2. Completion of the regulatory agency-required reports in multiple formats is another task that an automated system is well suited for. The System incorporating the invention can be programmed to provide a large number of reports. The base data are read by the report generator; then necessary sorting, formatting, etc. operations are performed; and the result is sent for printing. The only prerequisite to the report generation process is that the data be accurate. The process of acquisition data can be engineered into the collection process through the use of technologies such as bar coding, optical character recognition, electronic scales, etc. Each of these technologies could be integrated with the invention.

Report production requires selection of the particular report to produce, using the screen displays. At that point, the System takes over, and all further actions are performed by the System. The total time requirement of the System user is a few minutes.

3. Emergency Response Planning Process. The process of performing Emergency Response Planning is more efficient with the application of the invention for information management technology. The System can present regulatory agency guidelines for a specific chemical or chemicals. By sorting the list of chemicals used at a particular facility, chemicals subject to a specific regulatory agency's guidelines can be identified. Performing a secondary sort of the list of these chemicals will produce a list of sites where those chemicals are in use. This sort can be used to draft the Emergency Response Plan that would be submitted to a regulatory agency.

4. If an inverted frequency inspection program is adopted, the installation date of the underground storage tank is entered into the system. The System then determines the date the first inspection should occur, for example, five years from the installation date. Subsequent inspections could be set at one-year intervals after the first inspection date, and the System would remind the user to perform these inspections at the appropriate dates.

5. Application of EH&S information management technology can yield great benefits to an organization. These benefits arise in two major areas. (1) Prevention. By elimination of the risk of hazardous materials exposure, the risk of litigation is proactively limited. The System facilitates elimination of hazardous chemicals from the workplace by reviewing all chemicals in use at a facility in the Chemical Profile portion of the System. Some or all of the chemicals that are set forth on certain regulatory lists (i.e., California's Proposition 65-listed chemicals) can be methodically eliminated from use in the workplace or replaced by other chemicals that are not so listed. (2) Reduction of Exposure. Alternatively, where exposure is unavoidable, limiting employee exposure below the applicable hazardous substance thresholds and documenting the exposure limitation is another means of proactively limiting the risk of injury, illness and litigation. The process modeling function of the System can be monitored to identify processes that emit excessive amounts of specific hazardous materials. Each processes resulting in an emission level greater than a selected threshold for a specific chemical is targeted for emission reduction. If emission reduction technology is not available, a range of options is available, including input material replacement, process substitution, process shutdown and product reformulation. Information management technology can be applied to identify those processes that emit at a level greater than the specified threshold.

The invention would assist response to the lawsuit in the following manner.

(a) Review the chemicals that were in use in the workplace where Jane Doe was working.

(b) Review the hazards of the chemicals that were in use in the workplace where Jane Doe was working.

(c) Review the records of MSDS dissemination to XYZ employees, to determine whether Jane Doe had ever requested an MSDS for any of the chemicals that were in use in the workplace where she worked.

(d) Review the MSDS archive file to determine what was the then-most-current state of knowledge about the various chemicals which were in use in the workplace where Jane Doe worked at the time that she was working there.

(e) If hazardous materials were in use at the workplace where Jane Doe was working, and the hazardous materials were determined to be hazardous at the time that Jane Doe was working with them, review the personnel file for Jane Doe to determine whether Jane Doe had been warned about the dangers of working with the materials with which she was working. Also, review the company's relevant protocols established for tracking each employee who could be exposed the materials Jane Doe alleges she was exposed to in the workplace and determine if the relevant protocols were regularly followed.

(f) Finally, hazardous materials training can be tracked to determine the extent and magnitude of training that had been given to employees regarding the hazards of the materials they were working with at the time of possible exposure.

Each of the above actions can be facilitated by use of the System. The System can be used to review the chemicals used in a given workplace for specific hazards, such as carcinogens, mutagens, teratogens, poisons, etc. These chemicals can be targeted for elimination from the workplace. In the foregoing example, if all teratogenic chemicals had been eliminated from Jane Doe's workplace by the time she began working at XYZ, the basis for her claim would be rather weak.

The System can support reconstruction of the MSDS request history of each employee of XYZ. A list of all MSDS requests by a particular system user can be generated. Possibly, Jane Doe did not request an MSDS when it was available for review during her employment at XYZ.

If substances, later found to be teratogens, were in use at Jane Doe's workplace, the MSDS archive file would be reviewed to determine when the substances were determined to be teratogens. That information would then be compared against the historical record to determine when such substances were removed from the workplace. If the substances were promptly removed upon receipt of information that the substances were teratogens, the claim of intentional disregard for Jane Doe's health and safety would be rather weak.

If it is not practical to remove the teratogen from Jane Doe's workplace, the next step in a conscientious program of industrial hygiene would be to warn Jane Doe of the presence and known dangers of teratogen(s) in her workplace. The mechanism for provision of the warnings regarding the hazards of the material(s) in use in the workplace could be periodic training classes. The dates and content of the training classes could each be tracked, in addition to the dates of follow-up training. Included with the warning could be an offer of reassignment to another task that reduces or eliminates Jane Doe's exposure to such teratogens. If Jane Doe had refused the offer of reassignment upon being warned of the hazard, her claim of intentional negligence on the part of XYZ would also be weak.

6. Accidental Release Notification. The System can track all events related to a specific accident or other event and can record the circumstances that led to the accident, for example, that the hoe portion of backhoe struck piping leading to storage tank, resulting in the release of 2,000 gallons of etching compound. The System can automatically determine the specific chemicals that make up "Etching Compound" and compute the amount of each chemical that was released, in pounds or another convenient unit of measure. The System can store a list of emergency response contacts as part of the emergency response planning function. The System can track the accident or other event, as well as the XYZ response to the event. Finally, when a release has been contained and cleaned up, the System can produce the follow-up Accidental Release Notification Report. The System can also provide relevant protocols, before the fact, for responses to unscheduled or excess releases of one or more hazardous substances.

A System that incorporates the invention disclosed here can provide hazardous substance management for one facility or for two or more facilities simultaneously and can prepare, or be extended to prepare, any report or notice required for compliance with federal or state regulatory agency requirements.

A first preferred embodiment of the invention includes the first seven functional groupings (excluding the FMF 81) plus the database schema. However, the invention will also perform satisfactorily with inclusion of the following five functional groupings plus the database schema: Hazardous Materials Index 11, Hazardous Materials Management 31 Human Resource Management 41 and Hazardous Commitment Management 61 and Emergency Management 71. The invention will also perform satisfactorily if either the Hazardous Permit Management functional grouping 21 or the Hazardous Waste Management functional grouping 51 is combined these five functional groupings plus the database schema. The invention will also perform satisfactorily with three, four or five of the functional groupings plus database schema 91, provided that two of the functional groupings included are the Hazardous Materials Index grouping 11 and the Emergency Management grouping 71. With fewer than seven functional groupings incorporated in a system, portions of the hazardous substance management unit are not available for integrated operation.

In a second preferred embodiment, the Facility Management Function grouping 81 is integrated with the other 3–7 functional groupings, and the database schema 91 integrates and serves all of these functional groupings by rolling up all the information and sharing it between the appropriate functional groupings. In this embodiment, the regulatory agency and the regulated facility can exchange information relevant to operation of the facility.

In a third preferred embodiment of the invention, the Facility Management Function grouping 81 is operated by a cognizant regulatory agency that receives and shares information with any or all of the other seven functional groupings plus the database schema 91, which are operated by one of the regulated facilities.

Although the indicia used for identification of, and distinction between, containers, locations, MSDSs, etc. are referred to herein as "identification numbers", these indicia may be numbers, characters, symbols or other indicia that distinguish two or more similar items, such as two containers, two shelves, two chemicals, etc.

We claim:

1. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Hazardous Permit Management data means for monitoring and recording applications, approvals, renewals and expirations of regulatory agency permits allowing the facility to store, use, emit or discharge specified hazardous substances, for tracking and recording facility chemical emissions and waste discharges and the results of detection and testing of specified hazardous substance emissions and discharges, for tracking and recording variations between actual emissions and discharges and permitted emissions and discharges, and for tracking and recording the results of source reduction measures, if any, implemented at the facility;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Waste Management data means for tracking and recording selected waste management information concerning the facility, including production, accumulation, treatment and disposal of hazardous waste, for tracking and recording the changes, if any, in hazardous waste produced, based upon process modification, input material substitution, reformulation of an end product produced at the facility or modifications in inventory management implemented at the facility, for establishing and maintaining a Waste Profile on at least one hazardous substance that is produced as a by-product at the facility, for monitoring the length of time a hazardous waste has accumulated in a given waste container at the facility, for monitoring and recording the size, location, use, movement, treatment and disposal of a hazardous waste container at the facility, for creating a commitment, and recording completion of that commitment, to dispose of hazardous waste accumulated in a waste container when the length of time this waste has been accumulated in that container reaches a selected time interval, and for generating hazardous waste labels and Uniform Hazardous Waste Manifests to be used with a container containing hazardous waste that is to be disposed of away from the facility;

Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a database means, connected to each of the seven data means, for integrating these seven data means and for facilitating exchange of information between at least one of the following pairs of data means:

Hazardous Materials Index data means and Hazardous Materials Management data means;

Hazardous Materials Index data means and Hazardous Permit Management data means;

Hazardous Materials Index data means and Human Resource Management data means;

Hazardous Materials Index data means and Hazardous Waste Management data means;

Hazardous Materials Index data means and Hazardous Commitment Management data means;

Hazardous Materials Index data means and Emergency Management data means;

Hazardous Materials Management data means and Hazardous Permit Management data means;

Hazardous Materials Management data means and Human Resource Management data means;

Hazardous Materials Management data means and Hazardous Waste Management data means;

Hazardous Materials Management data means and Hazardous Commitment Management data means;

Hazardous Materials Management data means and Emergency Management data means;

Hazardous Permit Management data means and Hazardous Waste Management data means;

Hazardous Permit Management data means and Hazardous Commitment Management data means;

Hazardous Permit Management data means and Emergency Management data means;

Human Resource Management data means and Hazardous Waste Management data means;

Human Resource Management data means and Hazardous Commitment Management data means;

Human Resource Management data means and Emergency Management data means;

Hazardous Waste Management data means and Hazardous Commitment Management data means;

Hazardous Waste Management data means and Emergency Management data means; and

Hazardous Commitment Management data means and Emergency Management data means.

2. The apparatus of claim 1, wherein said Hazardous Materials Index data means records emergency response actions to be taken, and equipment and personnel to be used, to respond to an unplanned release of a hazardous substance.

3. The apparatus of claim 1, wherein said Hazardous Materials Index data means tracks and records information to be used in generating regulatory compliance reports by said facility.

4. The apparatus of claim 1, wherein said Hazardous Materials Management data means tracks and records the results of source reduction measures, if any, implemented at the facility.

5. The apparatus of claim 1, wherein said Hazardous Waste Management data means tracks and records the results of source reduction measures, if any, implemented at the facility.

6. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Waste Management data means for tracking and recording selected waste management information concerning the facility, including production, accumulation, treatment and disposal of hazardous waste, for tracking and recording the changes, if any, in hazardous waste produced, based upon process modification, input material substitution, reformulation of an end product produced at the facility or modifications in inventory management implemented at the facility, for establishing and maintaining a Waste Profile on at least one hazardous substance that is produced as a by-product at the facility, for monitoring the length of time a hazardous waste has accumulated in a given waste container at the facility, for monitoring and recording the size, location, use, movement, treatment and disposal of a hazardous waste container at the facility, for creating a commitment, and recording completion of that commitment, to dispose of hazardous waste accumulated in a waste container when the length of time this waste has been accumulated in that container reaches a selected time interval, and for generating hazardous waste labels and Uniform Hazardous Waste Manifests to be used with a container containing hazardous waste that is to be disposed of away from the facility;

Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a database means, connected to each of the six data means, for integrating these six data means and for facilitating exchange of information between at least one of the following pairs of data means:

Hazardous Materials Index data means and Hazardous Materials Management data means;

Hazardous Materials Index data means and Human Resource Management data means;

Hazardous Materials Index data means and Hazardous Waste Management data means;

Hazardous Materials Index data means and Hazardous Commitment Management data means;

Hazardous Materials Index data means and Emergency Management data means;

Hazardous Materials Management data means and Human Resource Management data means;

Hazardous Materials Management data means and Hazardous Waste Management data means;

Hazardous Materials Management data means and Hazardous Commitment Management data means;

Hazardous Materials Management data means and Emergency Management data means;

Human Resource Management data means and Hazardous Waste Management data means;

Human Resource Management data means and Hazardous Commitment Management data means;

Human Resource Management data means and Emergency Management data means;

Hazardous Waste Management data means and Hazardous Commitment Management data means;

Hazardous Waste Management data means and Emergency Management data means; and

Hazardous Commitment Management data means and Emergency Management data means.

7. The apparatus of claim 6, wherein said Hazardous Materials Index data means records emergency response actions to be taken, and equipment and personnel to be used, to respond to an unplanned release of a hazardous substance.

8. The apparatus of claim 6, wherein said Hazardous Materials Index data means tracks and records information to be used in generating regulatory compliance reports by said facility.

9. The apparatus of claim 6, wherein said Hazardous Materials Management data means tracks and records the results of source reduction measures, if any, implemented at the facility.

10. The apparatus of claim 6, wherein said Hazardous Waste Management data means tracks and records the results of source reduction measures, if any, implemented at the facility.

11. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at least one stage of such process, and for determining the amount of a hazardous substance stored at the facility at a given time;

Hazardous Permit Management data means for monitoring and recording applications, approvals, renewals and expirations of regulatory agency permits allowing the facility to store, use, emit or discharge specified hazardous substances, for tracking and recording facility chemical emissions and waste discharges and the results of detection and testing of specified hazardous substance emissions and discharges, for tracking and recording variations between actual emissions and discharges and permitted emissions and discharges, and for tracking and recording the results of source reduction measures, if any, implemented at the facility;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a database means, connected to each of the six data means, for integrating these six data means and for facilitating exchange of information between at least one of the following pairs of data means:

Hazardous Materials Index data means and Hazardous Materials Management data means;

Hazardous Materials Index data means and Hazardous Permit Management data means;

Hazardous Materials Index data means and Human Resource Management data means;

Hazardous Materials Index data means and Hazardous Commitment Management data means;

Hazardous Materials Index data means and Emergency Management data means;

Hazardous Materials Management data means and Hazardous Permit Management data means;

Hazardous Materials Management data means and Human Resource Management data means;

Hazardous Materials Management data means and Hazardous Commitment Management data means;

Hazardous Materials Management data means and Emergency Management data means;

Hazardous Permit Management data means and Hazardous Commitment Management data means;

Hazardous Permit Management data means and Emergency Management data means;

Human Resource Management data means and Hazardous Commitment Management data means;

Human Resource Management data means and Emergency Management data means;

Hazardous Commitment Management data means and Emergency Management data means.

12. The apparatus of claim 11, wherein said Hazardous Materials Index data means records emergency response actions to be taken, and equipment and personnel to be used, to respond to an unplanned release of a hazardous substance.

13. The apparatus of claim 11, wherein said Hazardous Materials Index data means tracks and records information to be used in generating regulatory compliance reports by said facility.

14. The apparatus of claim 11, wherein said Hazardous Materials Management data means tracks and records the results of source reduction measures, if any, implemented at the facility.

15. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Commitments Management data means for monitoring and recording hazardous substance compliance and reporting requirements, and the time requirements, if any, for such compliance, applicable to the facility, for advising the facility of salary inspections, examinations of safety equipment and equipment decontaminations to be performed periodically, and for monitoring creation of periodic hazardous substance reports for the facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a database means, connected to each of the five data means, for integrating these five data means and for facilitating exchange of information between at least one of the following pairs of data means:

Hazardous Materials Index data means and Hazardous Materials Management data means;

Hazardous Materials Index data means and Human Resource Management data means;

Hazardous Materials Index data means and Hazardous Commitment Management data means;

Hazardous Materials Index data means and Emergency Management data means;

Hazardous Materials Management data means and Human Resource Management data means;

Hazardous Materials Management data means and Hazardous Commitment Management data means;

Hazardous Materials Management data means and Emergency Management data means;

Human Resource Management data means and Hazardous Commitment Management data means;

Human Resource Management data means and Emergency Management data means; and

Hazardous Commitment Management data means and Emergency Management data means.

16. The apparatus of claim 15, wherein said Hazardous Materials Index data means records emergency response actions to be taken, and equipment and personnel to be used, to respond to an unplanned release of a hazardous substance.

17. The apparatus of claim 15, wherein said Hazardous Materials Index data means tracks and records information to be used in generating regulatory compliance reports by said facility.

18. The apparatus of claim 15, wherein said Hazardous Materials Management data means tracks and records the results of source reduction measures, if any, implemented at the facility.

19. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a fourth data means drawn from the class consisting of the following four data means:

Hazardous Permit Management data means for monitoring and recording applications, approvals, renewals and expirations of regulatory agency permits allowing the facility to store, use, emit or discharge specified hazardous substances, for tracking and recording facility chemical emissions and waste discharges and the results of detection and testing of specified hazardous substance emissions and discharges, for tracking and recording variations between actual emissions and discharges and permitted emissions and discharges, and for tracking and recording the results of source reduction measures, if any, implemented at the facility;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Waste Management data means for tracking and recording selected waste management information concerning the facility, including production, accumulation, treatment and disposal of hazardous waste, for tracking and recording the changes, if any, in hazardous waste produced, based upon process modification, input material substitution, reformulation of an end product produced at the facility or modifications in inventory management implemented at the facility, for establishing and maintaining a Waste Profile on at least one hazardous substance that is produced as a by-product at the facility, for monitoring the length of time a hazardous waste has accumulated in a given waste container at the facility, for monitoring and recording the size, location, use, movement, treatment and disposal of a hazardous waste container at the facility, for creating a commitment, and recording completion of that commitment, to dispose of hazardous waste accumulated in a waste container when the length of time this waste has been accumulated in that container reaches a selected time interval, and for generating hazardous waste labels and Uniform Hazardous Waste Manifests to be used with a container containing hazardous waste that is to be disposed of away from the facility; and Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility; and a database means, connected to each of the four data means, for integrating these four data means and for facilitating exchange of information between at least one of the following pairs of data means:

Hazardous Materials Index data means and Hazardous Materials Management data means;

Hazardous Materials Index data means and Emergency Management data means;

Hazardous Materials Index data means and the fourth data means;

Hazardous Materials Management data means and Emergency Management data means;

Hazardous Materials Management data means and the fourth data means; and

Emergency Management data means and the fourth data means.

20. The apparatus of claim 19, wherein said Hazardous Materials Index data means records emergency response actions to be taken, and equipment and personnel to be used, to respond to an unplanned release of a hazardous substance.

21. The apparatus of claim 19, wherein said Hazardous Materials Index data means tracks and records information to be used in generating regulatory compliance reports by said facility.

22. The apparatus of claim 19, wherein said Hazardous Materials Management data means tracks and records the results of source reduction measures, if any, implemented at the facility.

23. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and a third data means drawn from the class consisting of the following five data means:

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Hazardous Permit Management data means for monitoring and recording applications, approvals, renewals and expirations of regulatory agency permits allowing the facility to store, use, emit or discharge specified hazardous substances, for tracking and recording facility chemical emissions and waste discharges and the results of detection and testing of specified hazardous substance emissions and discharges, for tracking and recording variations between actual emissions and discharges and permitted emissions and discharges, and for tracking and recording the results of source reduction measures, if any, implemented at the facility;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Waste Management data means for tracking and recording selected waste management information concerning the facility, including production, accumulation, treatment and disposal of hazardous waste, for tracking and recording the changes, if any, in hazardous waste produced, based upon process modification, input material substitution, reformulation of an end product produced at the facility or modifications in inventory management implemented at the facility, for establishing and maintaining a Waste Profile on at least one hazardous substance that is produced as a by-product at the facility, for monitoring the length of time a hazardous waste has accumulated in a given waste container at the facility, for monitoring and recording the size, location, use, movement, treatment and disposal of a hazardous waste container at the facility, for creating a commitment, and recording completion of that commitment, to dispose of hazardous waste accumulated in a waste container when the length of time this waste has been accumulated in that container reaches a selected time interval, and for generating hazardous waste labels and Uniform Hazardous Waste Manifests to be used with a container containing hazardous waste that is to be disposed of away from the facility; and Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility; and a database means, connected to each of the three data means, for integrating these three data means and for facilitating exchange of information between at least one of the following pairs of data means:

Hazardous Materials Index data means and Emergency Management data means;

Hazardous Materials Index data means and the third data means; and

Emergency Management data means and the third data means.

24. The apparatus of claim 23, wherein said Hazardous Materials Index data means records emergency response actions to be taken, and equipment and personnel to be used, to respond to an unplanned release of a hazardous substance.

25. The apparatus of claim 23, wherein said Hazardous Materials Index data means tracks and records information to be used in generating regulatory compliance reports by said facility.

26. Apparatus for monitoring and tracking handling of hazardous substances at a regulated facility to promote compliance with applicable laws governing such substances, the apparatus comprising:

Hazardous Materials Index data means for constructing and recording a Chemical Profile for pure chemicals and mixtures thereof and a Material Safety Data Sheet containing information on physical and chemical properties, health and safety hazards, handling procedures, and emergency response procedures, for a hazardous substance used or produced at the facility for which a Material Safety Data Sheet is required, and for maintaining a chemical location table containing an inventory of hazardous substances, including amounts and concentrations thereof and methods for handling such substances, that are present at a given time at each of a selected group of locations at a facility;

Hazardous Materials Management data means for receiving and recording information on arrival, storage and use of a hazardous substance at, and departure of a hazardous substance from, the facility, for determining whether a Material Safety Data Sheet exists for such substance and, if this Sheet is not yet available, for creating a commitment by the facility to acquire or prepare a Material Safety Data Sheet for such hazardous substance if such substance is received or produced at the facility, for tracking the movement and use of a hazardous substance at the facility, for maintaining and storing for at least one chemical process that occurs at the facility a process definition, including what mixtures, process by-products, waste by-products, chemical emissions and waste discharges are generated or consumed at at least one stage of such process, and for determining the amount of a hazardous substance stored at the facility at a given time;

Hazardous Permit Management data means for monitoring and recording applications, approvals, renewals and expirations of regulatory agency permits allowing the facility to store, use, emit or discharge specified hazardous substances, for tracking and recording facility chemical emissions and waste discharges and the results of detection and testing of specified hazardous substance emissions and discharges, for tracking and recording variations between actual emissions and discharges and permitted emissions and discharges, and for tracking and recording the results of source reduction measures, if any, implemented at the facility;

Human Resource Management data means for tracking and recording exposure of each worker at the facility to specified hazardous substances, for determining when, if at all, a worker has received a maximum permissible exposure to any of these specified hazardous substances at the facility, for tracking and recording any workplace control that is implemented to improve the health or safety of at least one employee at the facility, for tracking and recording reported work-related illnesses and injuries for at least one employee at the facility, and for tracking and recording work-related training received and to be received by each worker at the facility;

Hazardous Waste Management data means for tracking and recording selected waste management information concerning the facility, including production, accumulation, treatment and disposal of hazardous waste, for tracking and recording the changes, if any, in hazardous waste produced, based upon process modification, input material substitution, reformulation of an end product produced at the facility or modifications in inventory management implemented at the facility, for establishing and maintaining a Waste Profile on at least one hazardous substance that is produced as a by-product at the facility, for monitoring the length of time a hazardous waste has accumulated in a given waste container at the facility, for monitoring and recording the size, location, use, movement, treatment and disposal of a hazardous waste container at the facility, for creating a commitment, and recording completion of that commitment, to dispose of hazardous waste accumulated in a waste container when the length of time this waste has been accumulated in that container reaches a selected time interval, and for generating hazardous waste labels and Uniform Hazardous Waste Manifests to be used with a container containing hazardous waste that is to be disposed of away from the facility;

Hazardous Commitments Management data means for monitoring and recording hazardous substance compliance and reporting requirements, and the time requirements, if any, for such compliance, applicable to the facility, for advising the facility of safety inspections, examinations of safety equipment and equipment decontaminations to be performed periodically, and for monitoring creation of periodic hazardous substance reports for the facility;

Emergency Management data means (1) for identifying at least one person at a selected site with emergency responder training, and the level of emergency responder training of the person, required to respond to an unplanned release, or to a release of an amount above a permitted amount, of a hazardous substance, (2) for identifying equipment to be used to respond to an unplanned release, or release of an amount above a permitted amount, of a hazardous substance, (3) for identifying first response actions to be taken for at least one unplanned release, or to at least one release of an amount above a permitted amount, of a hazardous substance, (4) for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance; and Facility Management data base means for recording and providing a searchable data base that includes information on at least one of the following categories: (1) information on at least one emergency response plan to be followed, and equipment and personnel to be used, to respond to an unplanned release of a hazardous substance at a regulated facility; (2) information on at least one emergency response action taken in response to any unplanned release of a hazardous substance when such an unplanned release actually occurred at a regulated facility; (3) information on at least one application by a regulated facility for a permit to release, treat, store or dispose of a hazardous substance, including at least one application for which the permit has not yet been granted; (4) information on at least one application for a permit by a regulated facility to use a hazardous substance in the business operations of that regulated facility, including at least one application for which a permit has not yet been granted; (5) information on at least one transportation manifest for transporting a hazardous waste from a regulated facility to a selected site where the hazardous waste will be treated, stored or disposed of; (6) information on the time during which at least one hazardous substance that is not part of inventory has been accumulated at a regulated facility; (7) information of the training of at least one employee at a regulated facility for handling a hazardous substance; (8) information of the training of at least one employee at a regulated facility for responding to an unplanned release of a hazardous substance at or adjacent to the regulated facility; (9) information received from at least one regulatory report received from a regulated facility concerning use, handling, storage, accumulation, treatment or disposal of a hazardous substance that is associated with that facility; (10) information on the compliance history of a regulated facility; and (11) information on payment of permit fees by a regulated facility; and a database means, connected to each of the eight data means, for integrating these eight data means and for facilitating exchange of information between at least one of the following pairs of data means:

Hazardous Materials Index data means and Hazardous Materials Management data means;

Hazardous Materials Index data means and Hazardous Permit Management data means;

Hazardous Materials Index data means and Human Resource Management data means;

Hazardous Materials Index data means and Hazardous Waste Management data means;

Hazardous Materials Index data means and Hazardous Commitment Management data means;

Hazardous Materials Index data means and Emergency Management data means;

Hazardous Materials Index data means and Facility Management data means;

Hazardous Materials Management data means and Hazardous Permit management data means;

Hazardous Materials Management data means and Human Resource Management data means;

Hazardous Materials Management data means and Hazardous Waste Management data means;

Hazardous Materials Management data means and Hazardous Commitment Management data means;

Hazardous Materials Management data means and Emergency Management data means;

Hazardous Materials Management data means and Facility Management data means;

Hazardous Permit Management data means and Hazardous Waste Management data means;

Hazardous Permit Management data means and Hazardous Commitment Management data means;

Hazardous Permit Management data means and Emergency Management data means;

Hazardous Permit Management data means and Facility Management data means;

Human Resource Management data means and Hazardous Waste Management data means;

Human Resource Management data means and Hazardous Commitment Management data means;

Human Resource Management data means and Emergency Management data means;

Human Resource Management data means and Facility Management data means;

Hazardous Waste Management data means and Hazardous Commitment Management data means;

Hazardous Waste Management data means and Emergency Management data means;

Hazardous Waste Management data means and Facility Management data means;

Hazardous Commitment Management data means and Facility Management data means; and Emergency Management data means and Facility Management data means.

27. The apparatus of claim 26, wherein said Hazardous Materials Index data means records emergency response actions to be taken, and equipment and personnel to be used, to respond to an unplanned release of a hazardous substance.

28. The apparatus of claim 26, wherein said Hazardous Materials Index data means tracks and records information to be used in generating regulatory compliance reports by said facility.

29. The apparatus of claim 26, wherein said Hazardous Materials Management data means tracks and records the results of source reduction measures, if any, implemented at the facility.

30. The apparatus of claim 26, wherein said Hazardous Waste Management data means tracks and records the results of source reduction measures, if any, implemented at the facility.

31. Apparatus for accumulating information by a regulatory agency on handling of hazardous substances at a regulated facility that handles at least one such substance, to monitor compliance with applicable laws governing such substances, the apparatus comprising:

Emergency Management data means (1) for identifying at least one person at a selected site with emergency responder training, and the level of emergency responder training of the person, required to respond to an unplanned release, or to a release of an amount above a permitted amount, of a hazardous substance, (2) means for identifying equipment to be used to respond to an unplanned release, or release of an amount above a permitted amount, of a hazardous substance, (3) means for identifying first response actions to be taken for at least one unplanned release, or to at least one release of an amount above a permitted amount, of a hazardous substance, (4) means for tracking and reporting emergency response actions taken in response to any unplanned release, or release of an amount above a permitted amount, of a hazardous substance that actually occurs at the selected site, and for providing information on at least one of the following items: (5) problematical chemical or physical reactions that may occur in an unplanned release, or in a release above a permitted amount, of at least one hazardous substance, and actions taken to suppress at least one such problematical chemical or physical reaction; (6) emergency treatment to be given to a person exposed to a hazardous substance in an unplanned release, or in a release above a permitted amount, of at least one hazardous substance; (7) particular equipment that may be targeted in an unplanned release, or in a release above a permitted amount, of at least one hazardous substance; (8) notification and evacuation procedures that are to be followed for an unplanned release, or in a release above a permitted amount, of at least one hazardous substance at the selected site; (9) a mutual aid or coordinated response agreement, if any, and procedures for response at the selected site or at another site for an unplanned release, or in a release above a permitted amount, of at least one hazardous substance; (10) remedial, cleanup or decontamination procedures to be followed after an unplanned release, or in a release above a permitted amount, of at least one hazardous substance; and (11) procedures to be followed for notification of at least one regulatory agency after an unplanned release, or in a release above a permitted amount, of at least one hazardous substance.

* * * * *